(12) United States Patent
McCoy et al.

(10) Patent No.: US 8,055,387 B2
(45) Date of Patent: Nov. 8, 2011

(54) BUILDING AUTOMATION SYSTEM DATA MANAGEMENT

(75) Inventors: Sean M. McCoy, Maple Grove, MN (US); David M. Richards, Andover, MN (US); Benedict Eiynk, Minneapolis, MN (US); Susan M. Mairs, St. Paul, MN (US)

(73) Assignee: Trane International Inc., New York, NY (US)

( * ) Notice: Subject to any disclaimer, the term of this patent is extended or adjusted under 35 U.S.C. 154(b) by 586 days.

(21) Appl. No.: 11/316,698

(22) Filed: Dec. 22, 2005

(65) Prior Publication Data

US 2007/0055759 A1 Mar. 8, 2007

Related U.S. Application Data

(63) Continuation-in-part of application No. 11/208,773, filed on Aug. 22, 2005.

(51) Int. Cl.
*G05B 11/01* (2006.01)
*G05B 15/00* (2006.01)
*G06F 15/16* (2006.01)
*G06F 15/173* (2006.01)
*G06F 15/177* (2006.01)
*H04B 7/00* (2006.01)
*H04L 12/28* (2006.01)

(52) U.S. Cl. ............ 700/276; 700/19; 700/20; 370/254; 370/310; 709/200; 709/220; 709/224; 709/227; 709/230

(58) Field of Classification Search .................... 700/19, 700/20, 276; 370/254, 310; 709/200, 220, 709/227, 230
See application file for complete search history.

(56) References Cited

U.S. PATENT DOCUMENTS

| 5,311,451 A | 5/1994 | Barrett |
| 5,321,603 A | 6/1994 | Schwenke |
| 5,384,697 A | 1/1995 | Pascucci |
| 5,444,851 A | 8/1995 | Woest |
| 5,463,735 A | 10/1995 | Pascucci et al. |

(Continued)

OTHER PUBLICATIONS

"BACnet, LonWorks War Continues for BAS Manufacturers", p. 14, Mar. 10, 1997 Issue of Air Conditioning, Heating & Refrigeration News.

(Continued)

*Primary Examiner* — Albert Decady
*Assistant Examiner* — Jennifer Norton
(74) *Attorney, Agent, or Firm* — Patterson Thuente IP

(57) ABSTRACT

A building automation system (BAS) comprising a plurality of end devices, at least one communication network, and a protocol-independent server engine. The end devices are each associated with at least one of a space, a system, or a subsystem for at least a portion of a building or a campus. The communication network supports a plurality of communication protocols and communicatively couples at least a portion of the plurality of end devices. The server engine is communicatively coupled to the at least one communication network and includes means for selectively implementing a dynamic extensibility capability for the BAS that establishes communications with and control of the plurality of end devices over the plurality of communication protocols, and means for selectively implementing an automatic configuration capability for the BAS that supports addition of end devices to the plurality of end devices by determining at least one characteristic of each end device. Methods of establishing communications with unknown end devices in a building automation system (BAS) based upon metadata descriptors provided by known and unknown end devices are also disclosed.

20 Claims, 12 Drawing Sheets

U.S. PATENT DOCUMENTS

| | | | |
|---|---|---|---|
| 5,511,188 A | 4/1996 | Pascucci et al. | |
| 5,522,044 A | 5/1996 | Pascucci et al. | |
| 5,550,980 A | 8/1996 | Pascucci et al. | |
| 5,559,955 A | 9/1996 | Dev et al. | |
| 5,598,566 A | 1/1997 | Pascucci et al. | |
| 5,761,432 A | 6/1998 | Bergholm | |
| 5,805,442 A | 9/1998 | Crater et al. | |
| 5,884,072 A | 3/1999 | Rasmussen | |
| 5,982,362 A | 11/1999 | Crater et al. | |
| 5,999,179 A | 12/1999 | Kekic | |
| 6,028,998 A | 2/2000 | Gloudeman et al. | |
| 6,067,477 A | 5/2000 | Waewalaarachchi et al. | |
| 6,098,116 A | 8/2000 | Nixon et al. | |
| 6,104,963 A | 8/2000 | Cebasek et al. | |
| 6,115,713 A | 9/2000 | Pascucci et al. | |
| 6,119,125 A | 9/2000 | Gloudeman et al. | |
| 6,141,595 A | 10/2000 | Gloudeman et al. | |
| 6,145,751 A | 11/2000 | Ahmed | |
| 6,148,355 A * | 11/2000 | Mahalingam | 710/104 |
| 6,154,681 A | 11/2000 | Drees et al. | |
| 6,157,943 A | 12/2000 | Meyer | |
| 6,167,316 A | 12/2000 | Gloudeman et al. | |
| 6,240,326 B1 | 5/2001 | Gloudeman et al. | |
| 6,241,156 B1 | 6/2001 | Kline et al. | |
| 6,263,387 B1 | 7/2001 | Chrabaszcz | |
| 6,266,726 B1 | 7/2001 | Nixon et al. | |
| 6,334,107 B1 | 12/2001 | Gale et al. | |
| 6,353,853 B1 | 3/2002 | Gravlin | |
| 6,389,331 B1 | 5/2002 | Jensen et al. | |
| 6,405,103 B1 | 6/2002 | Ryan et al. | |
| 6,487,457 B1 * | 11/2002 | Hull et al. | 700/17 |
| 6,496,893 B1 | 12/2002 | Arai | |
| 6,580,950 B1 | 6/2003 | Johnson et al. | |
| 6,584,095 B1 | 6/2003 | Jacobi et al. | |
| 6,584,096 B1 | 6/2003 | Allan | |
| 6,598,056 B1 | 7/2003 | Hull et al. | |
| 6,636,893 B1 | 10/2003 | Fong | |
| 6,708,505 B2 | 3/2004 | Nakamura et al. | |
| 6,714,977 B1 | 3/2004 | Fowler et al. | |
| 6,832,120 B1 | 12/2004 | Frank et al. | |
| 6,834,298 B1 | 12/2004 | Singer | |
| 6,925,571 B1 | 8/2005 | Motoyama | |
| 6,999,824 B2 | 2/2006 | Glanzer et al. | |
| 7,010,796 B1 | 3/2006 | Strom et al. | |
| 7,065,769 B1 | 6/2006 | Tolopka | |
| 7,080,142 B2 | 7/2006 | Galloway et al. | |
| 7,136,914 B2 | 11/2006 | Motoyama | |
| 7,165,109 B2 | 1/2007 | Chiloyan et al. | |
| 7,194,537 B2 | 3/2007 | Motoyama | |
| 7,206,791 B2 | 4/2007 | Hind et al. | |
| 7,240,106 B2 | 7/2007 | Cochran et al. | |
| 7,246,162 B2 | 7/2007 | Tindal | |
| 7,249,170 B2 | 7/2007 | Tindal et al. | |
| 7,250,856 B2 | 7/2007 | Havekost et al. | |
| 7,251,534 B2 | 7/2007 | Walls et al. | |
| 7,275,079 B2 | 9/2007 | Brodsky et al. | |
| 7,287,085 B1 | 10/2007 | Motoyama | |
| 7,287,257 B2 | 10/2007 | Meza | |
| 7,289,995 B2 | 10/2007 | Motoyama et al. | |
| 7,293,253 B1 | 11/2007 | Soukup | |
| 7,296,079 B2 | 11/2007 | Motoyama | |
| 7,302,469 B2 | 11/2007 | Motoyama | |
| 7,320,023 B2 | 1/2008 | Chintalapati | |
| 7,337,242 B1 | 2/2008 | Motoyama | |
| 7,349,761 B1 * | 3/2008 | Cruse | 700/276 |
| 7,392,310 B2 | 6/2008 | Motoyama | |
| 7,421,474 B2 | 9/2008 | Motoyama | |
| 7,433,740 B2 | 10/2008 | Hesse et al. | |
| 7,437,452 B2 | 10/2008 | Motoyama | |
| 7,437,596 B2 | 10/2008 | McFarland | |
| 7,447,766 B2 | 11/2008 | Motoyama | |
| 7,500,003 B2 | 3/2009 | Motoyama | |
| 7,502,848 B2 | 3/2009 | Motoyama | |
| 7,506,048 B1 | 3/2009 | Motoyama | |
| 7,512,450 B2 | 3/2009 | Ahmed | |
| 7,519,698 B2 | 4/2009 | Motoyama | |
| 7,533,167 B2 | 5/2009 | Motoyama | |
| 7,533,333 B2 | 5/2009 | Motoyama | |
| 7,536,450 B2 | 5/2009 | Motoyama | |
| 7,574,503 B2 | 8/2009 | Motoyama | |
| 7,606,894 B2 | 10/2009 | Motoyama | |
| 7,610,372 B2 | 10/2009 | Motoyama | |
| 7,610,374 B2 | 10/2009 | Motoyama | |
| 7,647,397 B2 | 1/2010 | Motoyama | |
| 7,765,826 B2 * | 8/2010 | Nichols | 62/298 |
| 7,870,090 B2 * | 1/2011 | McCoy et al. | 1/1 |
| 7,917,232 B2 * | 3/2011 | McCoy et al. | 700/17 |
| 2002/0016639 A1 | 2/2002 | Smith et al. | |
| 2002/0029096 A1 * | 3/2002 | Takai et al. | 700/276 |
| 2002/0042845 A1 | 4/2002 | Burmann et al. | |
| 2002/0136203 A1 | 9/2002 | Liva et al. | |
| 2002/0152028 A1 | 10/2002 | Motoyama | |
| 2002/0152292 A1 | 10/2002 | Motoyama | |
| 2003/0084176 A1 * | 5/2003 | Tewari et al. | 709/230 |
| 2003/0135765 A1 | 7/2003 | Hind et al. | |
| 2003/0158975 A1 | 8/2003 | Frank et al. | |
| 2003/0159129 A1 | 8/2003 | Frank et al. | |
| 2004/0059808 A1 | 3/2004 | Galloway et al. | |
| 2004/0075549 A1 | 4/2004 | Haller | |
| 2004/0143510 A1 | 7/2004 | Haeberle et al. | |
| 2004/0148288 A1 | 7/2004 | Haeberle et al. | |
| 2004/0215694 A1 | 10/2004 | Podolsky | |
| 2004/0215740 A1 | 10/2004 | Frank et al. | |
| 2004/0230323 A1 | 11/2004 | Glanzer et al. | |
| 2004/0243988 A1 | 12/2004 | Ota | |
| 2004/0249913 A1 | 12/2004 | Kaufman | |
| 2004/0254915 A1 | 12/2004 | Motoyama | |
| 2004/0255023 A1 | 12/2004 | Motoyama | |
| 2005/0071483 A1 | 3/2005 | Motoyama | |
| 2005/0090915 A1 | 4/2005 | Geiwitz | |
| 2005/0177642 A1 | 8/2005 | Motoyama | |
| 2006/0010232 A1 | 1/2006 | Page et al. | |
| 2006/0047787 A1 | 3/2006 | Agarwal et al. | |
| 2006/0058923 A1 | 3/2006 | Kruk et al. | |
| 2006/0130107 A1 | 6/2006 | Gonder et al. | |
| 2006/0155824 A1 | 7/2006 | Motoyama et al. | |
| 2006/0184659 A1 | 8/2006 | Motoyama et al. | |
| 2007/0005736 A1 * | 1/2007 | Hansen et al. | 709/220 |
| 2007/0043476 A1 | 2/2007 | Richards et al. | |
| 2007/0055698 A1 | 3/2007 | McCoy et al. | |
| 2007/0055756 A1 | 3/2007 | Richards et al. | |
| 2007/0055757 A1 | 3/2007 | Mairs et al. | |
| 2007/0055758 A1 | 3/2007 | McCoy et al. | |
| 2007/0055760 A1 | 3/2007 | McCoy et al. | |
| 2007/0061046 A1 | 3/2007 | Mairs et al. | |
| 2007/0067062 A1 | 3/2007 | Mairs et al. | |
| 2007/0261062 A1 | 11/2007 | Bansal et al. | |
| 2008/0281472 A1 * | 11/2008 | Podgorny et al. | 700/276 |
| 2009/0083416 A1 | 3/2009 | Nass et al. | |
| 2011/0047259 A1 * | 2/2011 | Sato et al. | 709/223 |
| 2011/0047418 A1 * | 2/2011 | Drees et al. | 714/57 |
| 2011/0131336 A1 * | 6/2011 | Wang et al. | 709/228 |

OTHER PUBLICATIONS

"Controls Companies See Opportunities on Internet", Mar. 1, 1997 Issue of Energy User News.

Tracer Summit Web Server, Dated Mar. 2003, Document No. BAS-PRC014-EN.

"Infinity WebServer" brochure, Copyright 1997 by Andover Controls Corporation, Document No. DS-WEBSVR-A.

"Facility Management Unleashed: web.Client", Copyright 2002 by Andover Controls, Document No. BR-WC-A.

"Building Automation Systems on the Internet", by Albert T.P. So, W. L. Chan and W.L. Tse, May/Jun. 1997 Issue of Facilities Magazine, vol. 15, No. 5/6, pp. 125-133.

"Connecting LonWorks and TCP/IP Enterprise Networks—Real Application Successes", by Coactive Aesthetics, dated 1997.

"Remote Building Monitoring and Control", an ACEEE paper, dated Jul. 18, 1996.

"Remote Building Control Using the Internet", by Edward Finch, Dec. 1998 Issue of Facilities Magazine, vol. 15-No. 12/13, pp. 356-360.

"Marketing Tracer Summit", a marketing guide dated Jan. 1998, Order No. BAS-MG-46.

"Tracer Summit Users Network", a marketing guide dated Mar. 2002, Order No. BAS-SLM005-EN.

Marketing the Tracer ZN.511 and ZN.521 Zone Controllers, a marketing guide dated Feb. 2001, Order No. BAS-SLM008-EN.

http://www.nettedautomation.com/glossary_menue/glossy_r.html.

"An Efficient Execution Model for Dynamically Reconfigurable Component Software"; Andreas Gal, Peter H. Frohlich, Michael Franz; Department of Information and Computer Science—University of California, Irvine; May 31, 2002; pp. 1-7; http://research.microsoft.com/~cszypers/events/WCOP2002/10_Gal.pdf.

Microsoft Computer Dictionary, Fifth Edition, "Server" definition, Published: 2002, Publisher: Microsoft Press, p. 474.

British Application No. GB0805149.2, Examination Report, Applicant Trane International Inc., dated May 18, 2010, 3 pages.

British Application No. GB0805151.8, Examination Report, Applicant Trane International Inc., dated Jun. 8, 2010, 2 pages.

PCT Patent Application No. PCT/US2006/032141, Applicant American Standard International, Inc., Written Opinion, dated Oct. 2, 2008.

PCT Patent Application No. PCT/US2006/031863, Applicant American Standard International, Inc., Search Report, dated Mar. 19, 2008.

International Search Report; PCT/US06/32141; dated Oct. 2, 2008.

Written Opinion; PCT/US06/32145; dated Jun. 28, 2008.

International Search Report; PCT/US06/32145; dated Jul. 2, 2008.

Written Opinion; PCT/US06/31863; dated Apr. 30, 2009.

PersonalSCADA 2.0 User's Guide, Eutech Cybernetics Pte Ltd., 2002.

"Tracer Summit, Building Automation System," TRANE, Doc #BAS-PRC001-EN, Aug. 2002.

GB Examination Report dated Aug. 10, 2009, 1 page.

File History for U.S. Appl. No. 11/208,773.
File History for U.S. Appl. No. 11/316,410.
File History for U.S. Appl. No. 11/316,695.
File History for U.S. Appl. No. 11/316,702.
File History for U.S. Appl. No. 11/316,703.
File History for U.S. Appl. No. 11/316,697.
File History for U.S. Appl. No. 11/316,687.
File History for U.S. Appl. No. 11/316,699.

GB Patent Application No. GB0805153.4; filed Aug. 17, 2006; Applicant Trane International, Inc.; GB Examination Report dated Mar. 12, 2010; 2 pages.

GB Patent Application No. GB1002641.7; filed Aug. 17, 2006; Applicant Trane International, Inc.; GB Search Report dated Mar. 12, 2010; 3 pages.

*Enterprise Buildings Integrator R310*, Specification Data, Honeywell, Mar. 2003, 20 pages.

PCT/US2010/023758, filed Feb. 10, 2010, Applicant Trane International, Inc., International Search Report/Written Opinion dated Aug. 19, 2010, 7 pages.

British Application No. GB 0805151.8, filed Aug. 17, 2006, Applicant Trane International Inc., Examination Report dated Jun. 8, 2010, 2 pages.

* cited by examiner

BUILDING AUTOMATION SYSTEM DATA MANAGEMENT

RELATED APPLICATIONS

This application is a continuation-in-part of U.S. patent application Ser. No. 11/208,773, filed on Aug. 22, 2005, entitled "Dynamically Extensible and Automatically Configurable Building Automation System and Architecture," and is also related to U.S. patent application Ser. No. 11/316,702, filed Dec. 22, 2005, entitled "Building Automation System Facilitating User Customization"; U.S. patent application Ser. No. 11/316,687, filed Dec. 22, 2005, entitled "Building Automation System Facilitating User Customization"; U.S. patent application Ser. No. 11/316,699, filed Dec. 22, 2005, entitled "Building Automation System Facilitating User Customization"; U.S. patent application Ser. No. 11,316,695, filed Dec. 22, 2005, entitled "Building Automation System Data Management"; U.S. patent application Ser. No. 11/316,703, filed Dec. 22, 2005, entitled "Building Automation System Data Management"; U.S. patent application Ser. No. 11/316,697, filed Dec. 22, 2005, entitled "Building Automation System Data Management"; and U.S. patent application Ser. No. 11/316,410, filed Dec. 22, 2005, entitled "Dynamically Extensible and Automatically Configurable Building Automation System and Architecture," all of which are hereby incorporated by reference in their entireties.

FIELD OF THE INVENTION

The present invention relates generally to building automation systems. More particularly, the present invention relates to data management techniques and systems for building automation system architectures, communications, and configurations.

BACKGROUND OF THE INVENTION

Building automation systems (BAS) are used to coordinate, manage, and automate control of diverse environmental, physical, and electrical building subsystems, particularly HVAC and climate control but also including security, lighting, power, and the like. Typical existing BAS systems are hardwired or use a proprietary communication standard or protocol to link the various subsystems and provide system-wide user access and control.

Hardwiring and manual programming of BAS systems can create a robust fixed system customized for a particular installation. These systems, however, often require extensive customization for each building or site. Particular manual programming and other installation elements may not be applicable to other systems, contributing to the costliness and time-consuming installation associated with such systems.

Further, hardwired systems and those using proprietary communication standards and protocols are difficult or impossible to integrate with system components, panels, and other elements from different vendors or generations. For example, a campus of buildings in which an upgraded BAS is being installed may have existing previous generation (legacy) systems and systems from more than one vendor. Installing a BAS and making it compatible with the existing systems in such a situation is time-consuming, requiring extensive manual service and programming to integrate the existing devices and implement the custom BAS. Manual service is typically provided by systems integration personnel. While systems integrators are not favorably viewed by BAS owners and managers because of the expense and interruption, systems integrators are a key aspect of the business models of many BAS manufacturers and vendors as revenue generation and on-site contact after the sale and initial installation of BASs. BAS manufacturers and vendors have therefore been reluctant to alter their models and eliminate systems integrators.

With the introduction of BACnet™, an ASHRAE (American Society of Heating, Refrigerating and Air-Conditioning Engineers) and ANSI (American National Standards Institute) protocol standard, and LonTalk™, a protocol integration approach developed by Echelon, some uniformity of standards and communications has been achieved in the industry. BACnet™ was intended to standardize HVAC interoperability and serve as a solution to industry-wide issues. In use, however, BACnet™ exists in multiple versions and includes various non-standard feature functions available to vendors. Many vendors dictate a particular BACnet™ version that must be used in order to achieve system compliance, forcing BAS users to update. BACnet™ is therefore not completely interoperable across versions and features. Further, present BASs are typically single protocol architectures. Thus, while a given BAS is "compatible" with a protocol standard, the BAS is natively compatible with only a single protocol, such as BACnet™, another standard protocol, or a proprietary protocol.

In a simplified analogy, a BAS can be compared to a bound book. Each installation of the BAS is a different reader of the book. The book may contain multiple chapters or sections and must be custom written and professionally bound for each reader. The chapters may each be written in a different language, if the BAS is compatible with multiple protocol versions or vendors. To read the various different languages that are in the book, the reader will need to manually consult a dictionary to translate each chapter into the reader's primary or preferred language. Multiple dictionaries may be needed. The reader may not be able to completely translate each language, or may only be able to translate some chapters into non-preferred languages in which the reader is merely conversant but not fluent, and therefore the reader may only obtain a basic understanding of one or more chapters. For example, one chapter of the book might be a first language representing a particular vendor's preferred or native version of BACnet™ for the BAS, while another chapter of the book represents another vendor's version of BACnet™ in a second language. If the second language is not one understood by the reader, the reader may only be able to become minimally proficient in the second language using the dictionary to translate. Without complete fluency, the book is not useful to the reader for high-level tasks or communicate effectively. Some languages may be untranslatable, requiring the reader to consult a translator to manually translate the chapter or chapters. Manual translation in particular is time-consuming and expensive, and if whole chapters are translated, the entire book must be professionally rebound to permanently incorporate the translated material. Without professional rebinding, the reader will need to repeat the manual translation the next time the book is read.

Additionally, BAS installation and maintenance are still generally labor-intensive custom tasks that vary with each system implementation. Upgrading, expanding, and updating or removing system components and services in particular are also complex tasks, as the existing BAS may or may not support new devices and must be manually reconfigured to recognize and incorporate changes. In a common scenario, a user managing a building site with two control units operating in an existing BAS wants to add a third control unit in a newly constructed wing of the building. The user must upgrade the existing control units to the new version of the third control unit in order for the system to be compliant because the system cannot accommodate multiple versions or integrate the new control unit.

Returning to the book analogy, then, when updates to chapters in the book are necessary, or when whole new chapters are added, the entire book must be returned to the original author to be rewritten and subsequently professionally rebound. Any dictionaries must also be updated accordingly and manual translations repeated. Updates and additions are therefore labor-intensive and time-consuming to accomplish.

Existing BASs also do not offer the accessibility, customization, and management tools desired by system users. Current BASs are difficult and communicatively cumbersome to manage on a large scale, such as by a regional or nationwide retailer or other organization. Further, while Internet-based and accessible systems are presently available and in use, these systems suffer from several drawbacks. Many current Internet BASs were created as add-ons to existing BASs and thus have integrated and proprietary designs. These systems do not offer the adaptability and extensibility necessary to interface with non-native systems and sub-systems, a particular issue with respect to large-scale systems implemented in existing structures. Existing system also do not provide higher-level extensibility, configurability, and customization tools.

More recently, ASHRAE has released an XML and BACnet™ web services interface specification. According to ASHRAE, the interface is intended to be communication protocol neutral in that defined web services can be used with any underlying protocol. This approach is a least common denominator approach that can span multiple BACnet™ version specifications, wherein BAS services are supported by the intrinsic functionality of the protocol. This approach, however, still requires a gateway or translation to normalize special or proprietary functions and also requires translation or normalization between protocols rather than more smoothly running each protocol natively. Further, while the functions can be translated or normalized, data is often not given complete semantic meaning or context. In other words, while least common denominator systems can recognize data as red, blue, or green, these systems cannot recognize shades of these colors, and data loses some level of meaning when generalized to only the primary color.

For these and other reasons, a need remains for an intelligent BAS having a flexible and dynamic architecture and providing increased communication, management, and control options, particularly from a user perspective.

SUMMARY OF THE INVENTION

The present invention substantially addresses the aforementioned needs and relates to data management techniques and systems for building automation system (BAS) architectures, communications, and configurations.

In one embodiment, the invention is directed to a BAS comprising a plurality of end devices, at least one communication network, and a protocol-independent server engine. The end devices are each associated with at least one of a space, a system, or a subsystem for at least a portion of a building or a campus. The communication network supports a plurality of communication protocols and communicatively couples at least a portion of the plurality of end devices. The server engine is communicatively coupled to the at least one communication network and includes programming means for selectively implementing a dynamic extensibility capability for the BAS that establishes communications with and control of the plurality of end devices over the plurality of communication protocols, and programming means for selectively implementing an automatic configuration capability for the BAS that supports addition of end devices to the plurality of end devices by determining at least one characteristic of each end device. The at least one characteristic may be a self-describing status or a non-self-describing status. The server engine further comprises programming means for accepting and storing data and metadata descriptors communicated from an end device having a self-describing status. The server engine also comprises, for an end device having a non-self-describing status, programming means for searching a database of data and metadata descriptors for end devices maintained by the server engine for data and metadata descriptors based on the non-self-describing status of the end device and automatically requesting supplemental manually programmed data and metadata descriptors for the end device if the non-self-describing status of the device is not sufficient to retrieve data and metadata descriptors for the end device from the database.

The invention includes other building automation systems in other embodiments. The invention is also directed to methods of establishing communications with unknown end devices in a building automation system (BAS) based upon metadata descriptors provided by known and unknown end devices.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
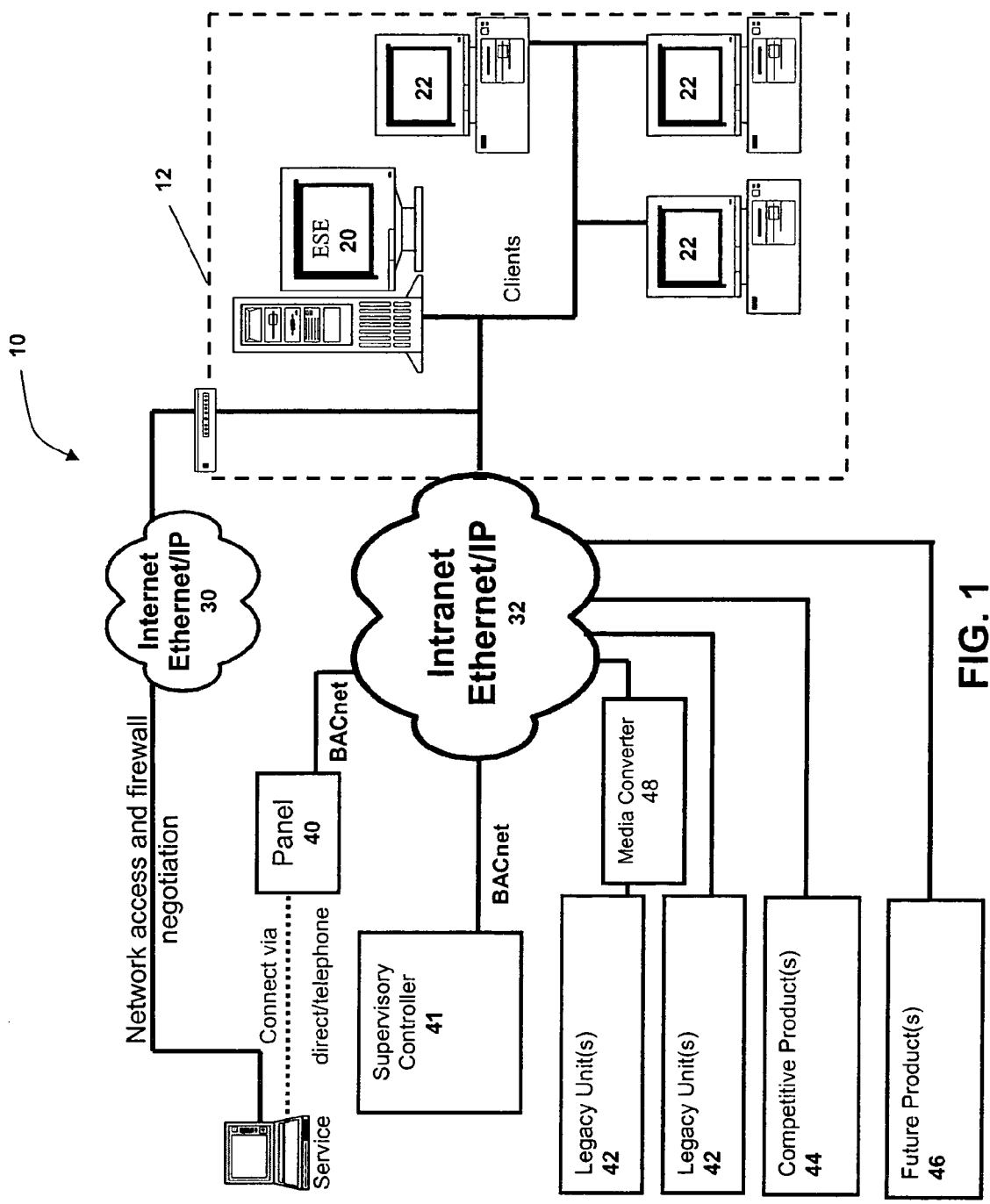
FIG. 1 is a building automation system (BAS) according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The systems and methods of the invention can effectively prioritize and manage data and information within a locally or widely distributed building automation system (BAS), from a space or building level to an enterprise level, encompassing virtually any structure, cluster, campus, and area in between. The systems and methods are particularly suited for a dynamically extensible and automatically configurable BAS and architecture, such as is disclosed in related and previously identified co-pending U.S. patent application Ser. No. 11/208,773, entitled "Dynamically Extensible and Automatically Configurable Building Automation System and Architecture," and the previously identified co-pending U.S. patent application Ser. No. 11/316,702, filed Dec. 22, 2005, entitled "Building Automation System Facilitating User Customization"; U.S. patent application Ser. No. 11/316,687, filed Dec. 22, 2005, entitled "Building Automation System Facilitating User Customization"; U.S. patent application Ser. No. 11/316,699, filed Dec. 22, 2005, entitled "Building Automation System Facilitating User Customization"; U.S. patent application Ser. No. 11/316,695, filed Dec. 22, 2005, entitled "Building Automation System Data Management"; U.S. patent application Ser. No. 11/316,703, filed Dec. 22, 2005, entitled "Building Automation System Data Management"; U.S. patent application Ser. No. 11/316,697, filed Dec. 22, 2005, entitled "Building Automation System Data Management"; and U.S. patent application Ser. No. 11/316,410, filed Dec. 22, 2005, entitled "Dynamically Extensible and Automatically Configurable Building Automation System and Architecture," all of which have been incorporated herein by reference.

The invention can be more readily understood by reference to FIGS. 1-12 and the following description. While the invention is not necessarily limited to the specifically depicted application(s), the invention will be better appreciated using a discussion of exemplary embodiments in specific contexts.

The BAS is an automatically and intelligently scalable object-oriented system in one embodiment, providing multi-site management capabilities in a local or widely distributed geographic area. In one embodiment of the present invention, a BAS architecture is anchored by an enterprise server engine (ESE). The BAS and ESE comprise a versatile and robust processor-based control system with a communications protocol-agnostic head-end that operably supports the management of HVAC and other subsystems in one or more buildings from a central location internal to or remote from any of the buildings. The BAS is preferably networked for user accessibility. In one embodiment, the BAS is user-accessible via either or both a computer system on an Intranet or the Internet as a web-enabled application running on a web server. The web and network applications provide operational services for HVAC and other subsystems.

In one embodiment, the BAS is capable of supporting and integrating legacy, current, and next generation components and subsystems. The BAS is further able to support common vendor or manufacturer systems as well as competitor systems by intelligently identifying the systems and/or subsystems and facilitating integration into the dynamically extensible BAS architecture. This flexibility enables the BAS architecture to support added applications and new control panel and subsystem types and versions without recompilation and reissue, and to extend, customize, and tailor the BAS to specific needs in a particular implementation. Further, dynamic extensibility enables a complex system to provide enhanced versatility and usability.

Returning to the aforementioned book analogy, the BAS of the present invention is a library of books, rather than a single, inflexible, permanently bound book as in the prior art. Each end device of the BAS of the invention brings its own book to the library. Each book is not bound but is rather loose-leaf, easily able to accept additions or revisions. A reader therefore does not need to rely on a single, large, inflexibly bound book that must repeatedly be rewritten and rebound to accommodate update or additions and that comprises chapters in multiple languages requiring translation according to a potentially limited dictionary or by a manual translator. Instead, the library includes a multi-lingual librarian (the ESE) to access individual books as needed, wherein the books are always up-to-date. As new books are added to the library, existing books are automatically updated by the librarian to incorporate information gleaned from the newer material. Further, the library includes a card catalog that not only describes the individual books but references interrelations and similarities among multiple books in the library. The card catalog is also automatically updated as new books are added to the library. The BAS of the invention essentially creates an automated librarian who can consult an individual book, speak any necessary language, and learn new languages on the fly, as needed. This way the BAS of the invention can be thought of as an infinite or universal Turing machine, whereas previous BASs can only be classified as finite machines.

Referring to FIG. 1, a BAS 10 according to one embodiment of the invention comprises an ESE 20 preferably located at a central location 12, such as a headquarters or control station. ESE 20 comprises a single local device in one embodiment. In another embodiment, ESE 20 comprises a multiple server configuration operating in a local or distributed environment. ESE 20 may also comprise other single, multiple, and/or networked computers or microprocessors; single or multiple servers; hardware; software; firmware; software and software instructions comprising firmware; and/or any other combination of computing and storage means, and programming means, for establishing communications with and for controlling distributed points and devices within BAS 10, for selectively implementing a dynamic extensibility capability and an automatic configuration capability, and for accepting, storing, caching, searching for, requesting, serving, and/or loading data and information, as described in more detail below.

ESE 20 is preferably locally networked at location 12 and communicatively coupled to the Internet 30, Intranet 30, and/or any other compatible communication means for communicatively coupling ESE 20 with one or more other points or devices within BAS 10 and for facilitating a dynamic extensibility capability and an automatic configuration capability. ESE 20, via communication means such as the Internet 30 and/or Intranet 20, therefore can provide access and management control from virtually any location via a computer system, internal or external to a user's computer system. ESE 20 and BAS 10 need not be web-based or communicatively coupled to the Internet 30 as shown in FIG. 1, as other compatible communication means and options known to those skilled in the art exist. Communication means such as the Internet 30 and/or Intranet Ethernet/IP 32 or another local area network (LAN) or wide area network (WAN) facilitate communications between ESE 20 and other system components and devices. Some or all communications and connections may be either wired or wireless within portions of BAS 10 as needed or desired.

Each implementation of BAS 10 can vary substantially by size, composition of devices, and balance of present, legacy, and future generation devices. BAS 10 can also vary by vendor/manufacturer, type, physical layout of building and/or campus, user needs, and other characteristics. Therefore, each implementation of BAS 10 and ESE 20 in particular is done on a site-by-site basis in one embodiment. ESE 20 can recognize, communicate with, and control a variety of system devices, including present generation and common manufacturer, legacy or previous generation, and competitor controllers and building automation panels. BAS 10, via ESE 20, can also expand to integrate next-generation devices. Accordingly, ESE 20 comprises microprocessor, computing, storage, and/or other compatible means for accepting and storing data and metadata descriptors from BAS 10 points, and microprocessor, computing, storage, and/or other compatible means for automatically requesting supplemental manually programmed data and descriptors if metadata descriptors are unavailable. Data and metadata descriptors within BAS 10 are described in more detail below.

As depicted in FIG. 1, for example, a present generation supervisory controller 41, such as a Building Control Unit manufactured by TRANE®, the assignee of the present application, or a panel 40, can be directly communicatively coupled to the Internet 30 and/or Intranet 32, while legacy unit(s) 42 can be directly communicatively coupled to the Internet 30 and/or Intranet 32 or coupled via a media converter 48. Legacy unit(s) 42 can include, for example, TRACER SUMMIT and TRACKER units manufactured by TRANE®, the assignee of the present application. Media converter 48 is preferably a simple translator but may also comprise other more sophisticated devices as needed. Media converter 48 is preferably not but may also be used with competitive product(s) 44 and/or future product(s) 46 in various embodiments. Competitive products 44 are also preferably directly coupled to the Internet 30 and/or Intranet 32. The term "competitive" is used to generally refer to products manufactured by an outside organization with respect to ESE 20. Manufacturers of building comfort and control products and systems that may comprise competitive product(s) 44 include JOHNSON CONTROLS, HONEYWELL, TRIDIUM, YORK, GENERAL ELECTRIC, CARRIER, and others.

ESE 20 is further able to support future product(s) 46, such as updated versions of current controllers, newly developed products, and the like. Preferably, at least a plurality of panels 40, present controllers 41, legacy units 42, competitive products 44 or future products 46 are building automation, control or HVAC products, representative examples of which include: furnaces and heating systems; chillers, including mechanical and absorption; air conditioners, filters, and air purifiers; fire and life safety systems; security systems; electrical system monitors and controllers; lighting system monitors and controllers; ventilation system monitors and controllers; sensors, including smoke, light, occupancy, motion, humidity, and others; pumps; air handlers; fluid and air moving and handling equipment; terminal products and devices; life science and pharmacological control equipment and monitoring systems, including positive and negative pressure clean rooms; industrial automation and control equipment and systems; programmable logic controllers; and others. ESE 20 is also preferably able to coexist and cooperate with other similar but previous generation control and management systems, as will be described in more detail below.

Panel 40, supervisory controller 41, legacy units 42, competitive products 44, and future products 46 may be generally referred to herein as BAS end devices. In accordance with the descriptions herein of panels 40, supervisory controllers 41, legacy units 42, competitive products 44, and future products 46, BAS end devices can comprise input/output points, binary and analog devices, embedded controllers, sensors, and any other control/sensor means for measuring and communicating data about at least one of a point, a device, a space, a system, or a subsystem for at least a portion of a building or campus the like. The term "end devices" is used only as a convenient, generalized reference to points within BAS 10, and the context of the term "end" in particular is not intended to be limiting or to imply a point of communicative or control termination in any given instance from the perspective of BAS 10. For example, end devices such as supervisory controllers 41 can function as intermediaries between ESE 20 and additional end device-side equipment.

Further, BAS 10 can comprise non-real end devices, or points, and virtual end devices. A non-real end device, in one embodiment, is a representation of a real, actual, or physical end device instantiated by ESE 20 and associated with or related to one or more actual, real, or physical BAS end devices. A real end device is an end device as depicted and described herein throughout, the term "real" used only to describe an end device relative to an instantiated "non-real" end device, as will be understood by those skilled in the art. Non-real end devices can be derived and instantiated by ESE 20 from algorithmic relationships among at least a plurality of real end devices, or end device points or values. One example of a non-real end device or point is a building efficiency. Building efficiency is related to both input and output characteristics of BAS end devices and BAS 10 equipment. Other examples include or are related to set points and comfort settings. ESE 20 is adapted to automatically update or redefine the non-real end devices in accordance with the dynamic extensibility and automatic configurability of BAS 10.

BAS 10 can also treat a particular BAS end device differently for different applications, creating a virtual end device. A virtual end device is a custom or otherwise altered definition or treatment of an actual, real, or physical BAS end device. An actual end device is an end device as depicted and described herein throughout, the term "actual" used only to describe an end device relative to a "virtual" end device, as will be understood by those skilled in the art. For context or convenience, user might select that an end device be presented as a first type, while BAS 10 operates and communicates with an end device that comprises, in reality, a second type. To satisfy the user, to permit the user to view and interact with the end device as an end device the user is comfortable with, or for the sake of a consistent interface, BAS 10 can present the end device to the user as a virtual end device of the first type even though the end device is actually implemented and controlled by BAS 10 as the second type.

A user accesses and interacts with BAS 10 through a graphical user interface (GUI or "user interface") presented on one or more computer devices 22 in one embodiment as described in further detail in the previously referenced co-pending applications which have been incorporated herein by reference. Each device 22 is communicatively coupled with BAS 10. The user interface of BAS 10 may be provided by virtually any device 22 with a visual display and a communicative connection to system 10. Some examples of such devices are a personal desktop, laptop, or portable computer (PC); a portable digital assistant (PDA); a cellular phone; and other similar devices. Typically, the connection between device 22 and BAS 10 is provided by the Internet 30, an Intranet system 32, and/or some other local or wide area communication network, although other means of connection and combinations of connections are also possible. For example, if an Internet-enabled cellular phone is used, the connection comprises, at least in part, a wireless cellular communication network.

Each BAS end device 40, 31, 42, 44, and 46 is modeled as an object in the context of BAS 10 of the invention. In object-oriented BAS 10 and ESE 20, efficiencies are achieved by modeling common objects for recognition and application to other similar objects. An object, simply put, is an instance of a class, or an encapsulation of descriptive behaviors and functionality of a group. A general object can then be made specific based upon rules applied to the object. Referring to BAS 10, an end device object may encompass virtually any type or piece of equipment, or any input or output point, in BAS 10, as well as any application or data structure relevant to BAS 10.

BAS 10 is able to reduce manual programming and integration of new devices by taking an object-oriented approach to system devices and components. BAS 10 is further able to identify and call attention to objects and object-related events that are not recognized such that manual service and attention can be delivered. Object orientation of data and metadata management within BAS 10 supports dynamic extension and automatic configuration of BAS 10, including the components and architecture of BAS 10 and informational and managerial representations of the structure and status of BAS 10 in the user interface. Dynamic extension and automatic configuration create a circularly recursive system with the self-descriptive objects and system use of plastic and extensible metadata from and about the objects. BAS 10 metadata is therefore multi-level, redirectable, and extensible in one embodiment. Further, the dynamic extensibility of BAS 10 enables a user to utilize the user interface to customize and control BAS 10, including the user interface itself, without the need for reprogramming or recompiling code.

Figure 2:
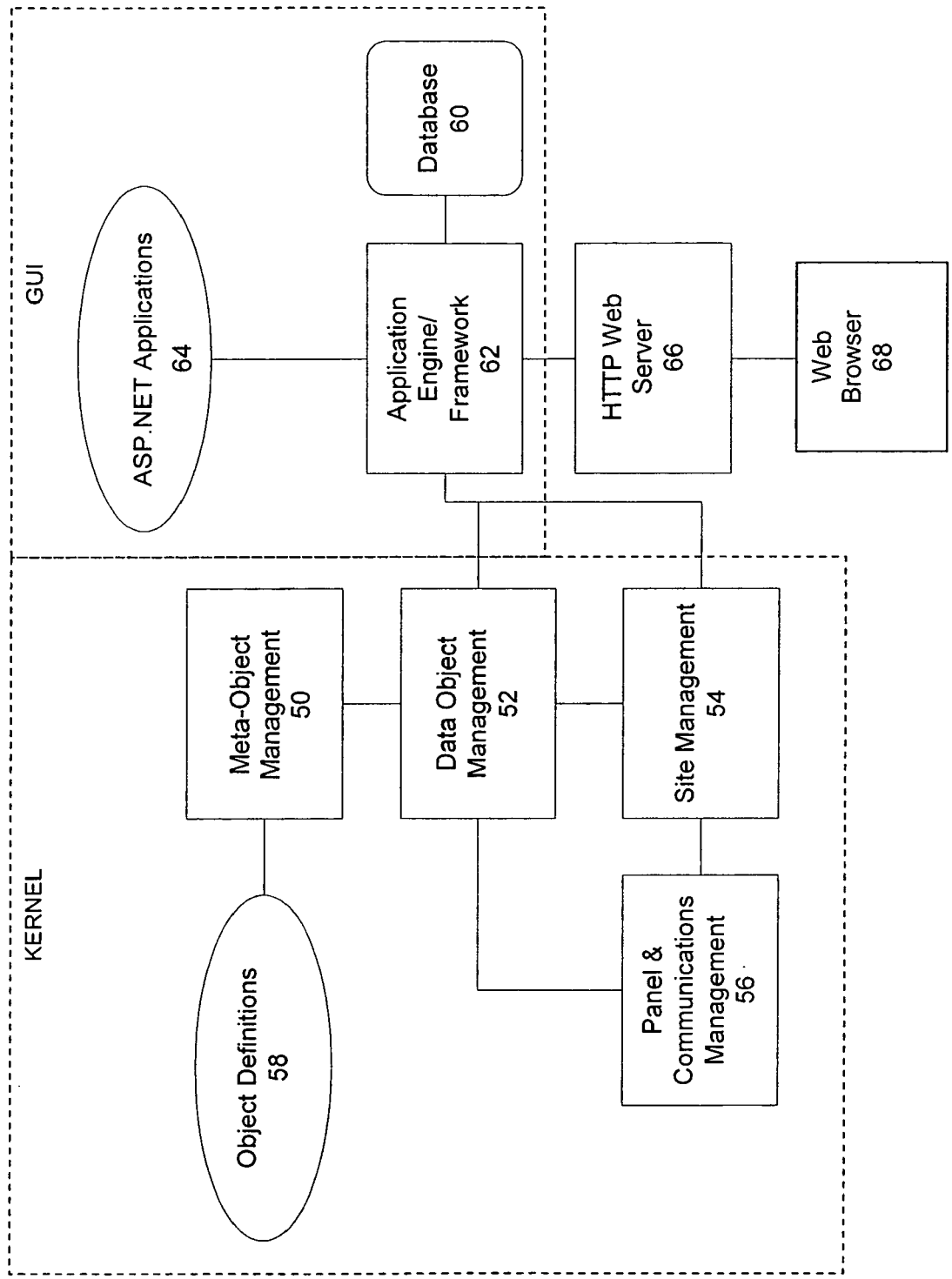
FIG. 2 is an object diagram according to one embodiment of the invention.

Accordingly, FIG. 2 is a diagram of an operating architecture of BAS 10 according to one embodiment. In dynamically extensible and scalable BAS 10, objects exist in a hierarchical or class structure. For example, data objects, site objects, and panel objects are interrelated and can be relatively defined, with the objects including or associated with respective object definitions 58, such as type, version, vendor, and the like, that are stored in a database 60 and interpreted by BAS 10 within an application engine/framework 62 with ESE 20 to determine how the particular object is to be handled by BAS 10. Internal meta-object management 50, data object management 52, site management 54, and panel and communications management 56, with object definitions 58, represent the kernel of ESE 20 of BAS 10 and interface application engine/framework 62 with external sources and entities to manage objects within BAS 10. The kernel preferably comprises the p-code engine and is extensible. Application engine/framework 62 with database 60 and ASP.NET applications 64 comprise graphical user interface element representations within an operating architecture of ESE 20. Database 60 is a data store or Sequel server external to a graphical user interface program in one embodiment. A web server 66 then interfaces BAS 10 via application engine/framework 62 to an external interface. In one preferred but non-exclusive embodiment, the external interface comprises a GUI presented via an Internet 30 or intranet 32 system using a web browser program. Web server 66 and web browser 68 in FIG. 2 are not client-side web server and web browser software elements but rather representations of ESE 20 operational architecture components.

Figure 3:
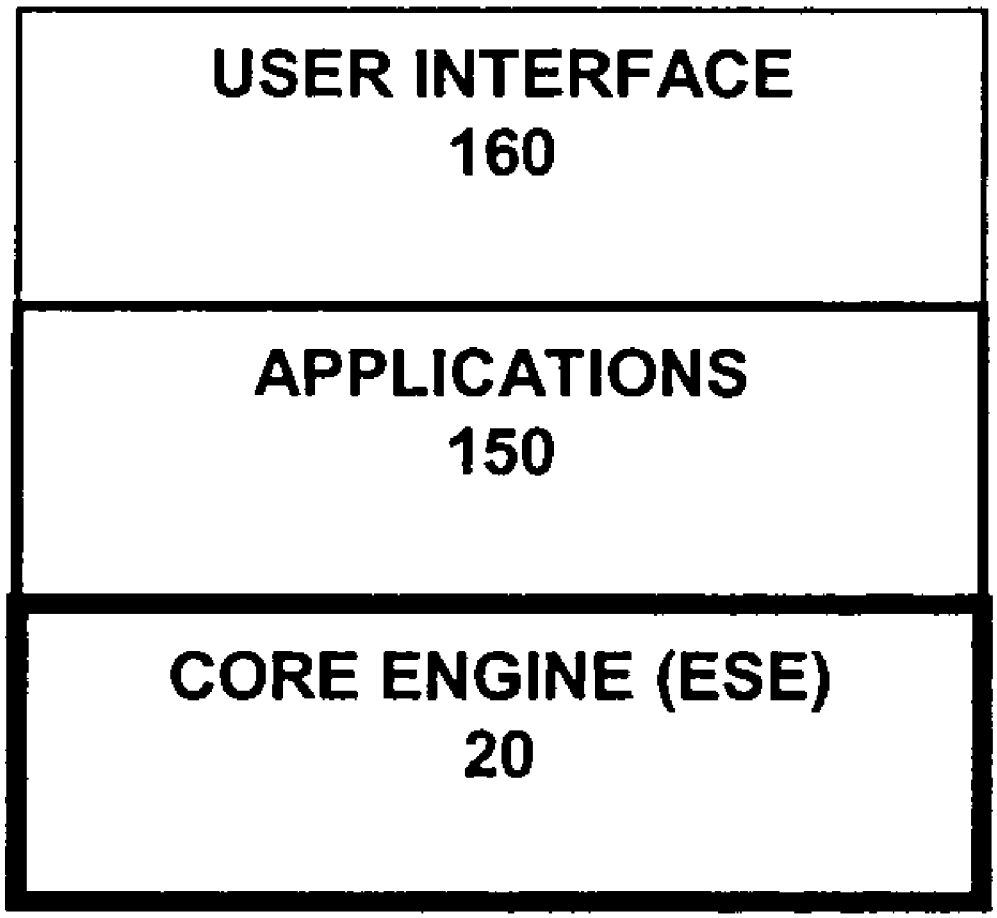
FIG. 3 is an architecture block diagram according to one embodiment of the invention.

The core engine, or ESE 20 in the embodiment of FIG. 1, forms a foundation or platform for BAS 10. Referring to FIG. 3, ESE 20 supports the operating architecture of BAS 10, including applications 150 and user interface 160 within BAS 10. ESE 20 within the system architecture further defines and describes the whole of the engine support. System architecture is described in more detail in related U.S. patent application Ser. No. 11/208,773, entitled "Dynamically Extensible and Automatically Configurable Building Automation System and Architecture," which has been incorporated herein by reference.

Figure 4:
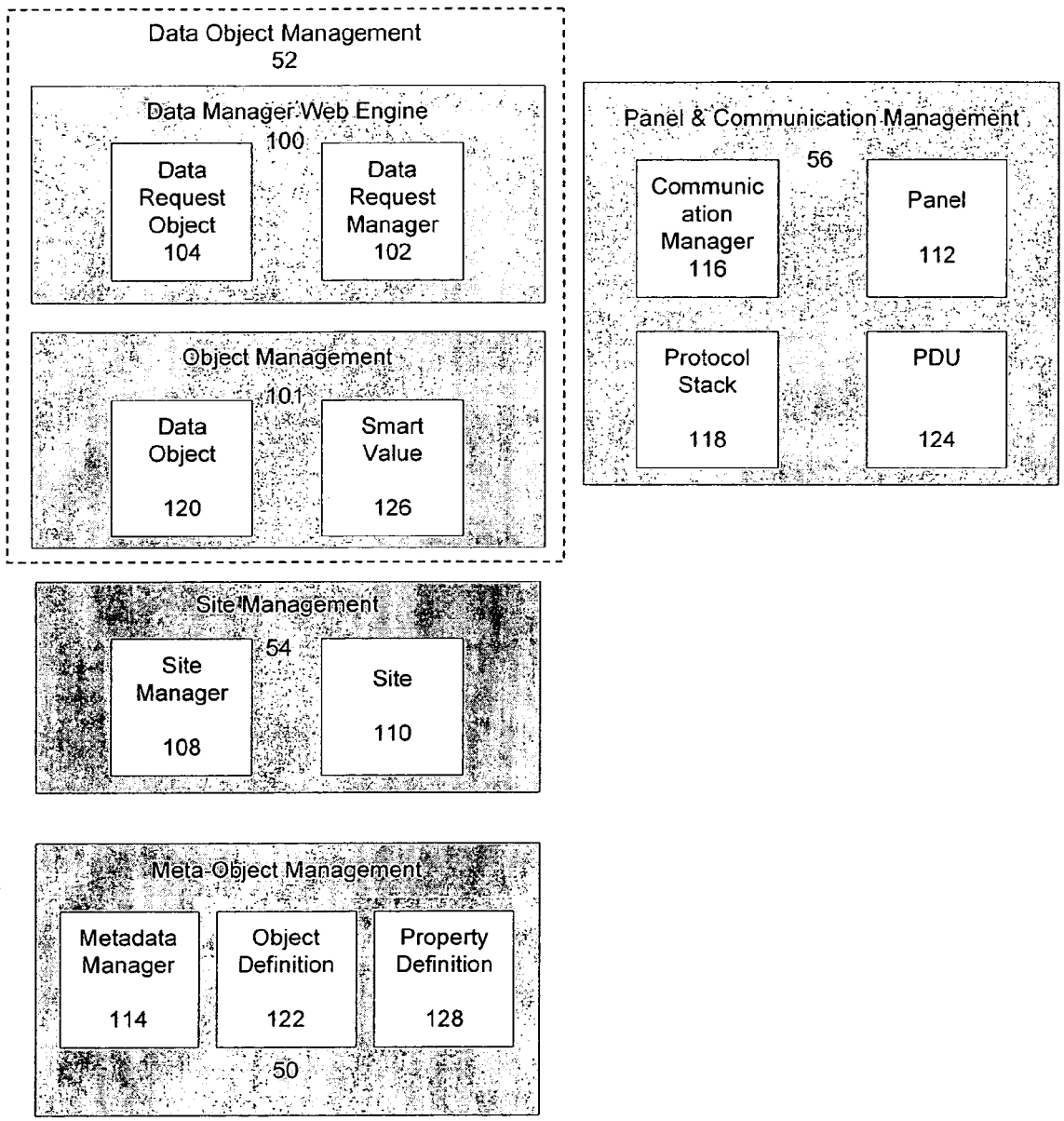
FIG. 4 is a data model block diagram according to one embodiment of the invention.

The main objects and classifications used by BAS 10 in one embodiment are shown in FIG. 4 with reference to FIG. 2. Data object management 52 includes a data manager web engine 100 and object management 101. Data manager web engine 100 includes a data request manager 102 and a data request object 104. Data request manager 102 is an object for managing incoming XML requests, and for creating data request objects 104, associated data objects 120, and the associated URL and identification for outside clients to use as a reference. Data request manager 102 is also a cache for data request object 104 and data object 120 from the user interface and/or any client. Data request object 104 is an object that contains a collection of read requests. Object management 101 includes data object 120 and smart value 126. Data object 120 is an object that encapsulates one or more objects that exist in each panel, including both equipment and application objects. Smart value 126 is an object that encapsulates the properties that exist in the data objects and is responsible for encoding/decoding raw data into and out of any external format and for performing conversions, if needed.

Site management 54 includes a site manager 108 and site 110. Site manager 108 is an object responsible for managing all sites 110, starting, adding, and operations that transcend sites. Site 110 is an object that is central for interacting with a building, which includes at least one individual panel object 112. In one embodiment, a building is seen as a site 110 by ESE 20. A particular site 110, however, can be an individual building or a campus of more than one building. Conversely, a single building can include more than one site 110.

Referring again to FIG. 1, for example, panel 40, supervisory controller 41, legacy unit(s) 42, competitive product(s) 44, and future product(s) 46 together may comprise a single site 110, or some or each of panel 40, supervisory controller 41, legacy unit(s) 42, competitive product(s) 44, and future product(s) 46 may be located at more than one distinct site 110. ESE 20 in BAS 10 can default to a single building, single site view in one embodiment, which can then be customized or altered according to a user preference or a system characteristic or discovery data. In one particular example, a manufacturing facility includes a first user- and system-defined site 110 consisting of a front office area and a second user- and system-defined site 110 consisting of the manufacturing floor. This plural site definition can make it more convenient and intuitive from a facility perspective to manage disparate spaces.

Meta-object management 50 includes a metadata manager 114, an objection definition 122, and a property definition 128. Metadata manager 114 is an object for parsing in metadata XML files and managing metadata definitions and is preferably cached by panel type, version, and object type in one embodiment. Object definition 122 is a metadata object that defines the properties, services, and behaviors of data object(s) 120. Property definition 128 is a metadata object that defines the attributes and behaviors for the properties of an object.

Panel and communication management 56 includes communication manager 116, panel 112, protocol stack 118 and protocol data unit (PDU) 124. Communication manager 116 is an object responsible for managing all the communication ports, threads, and protocol stacks. Panel object 112 is an object that represents the physical panel(s) and manages the version of metadata to use and services available for the protocol stack. PDU 124 is an object responsible for an encoding/decoding algorithm for the properties over the communication wire.

Figure 5:
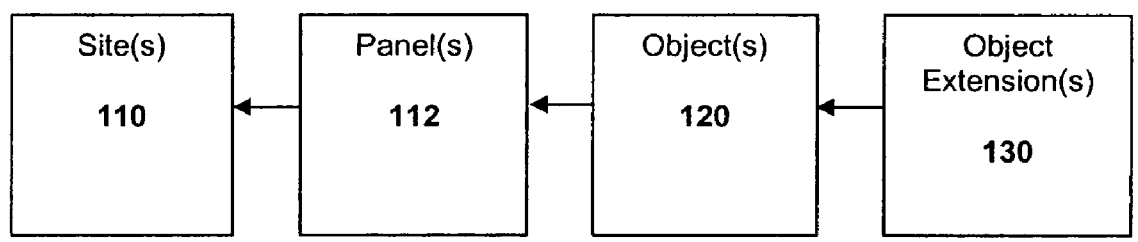
FIG. 5 is a data model block diagram according to one embodiment of the invention.
Figure 6:
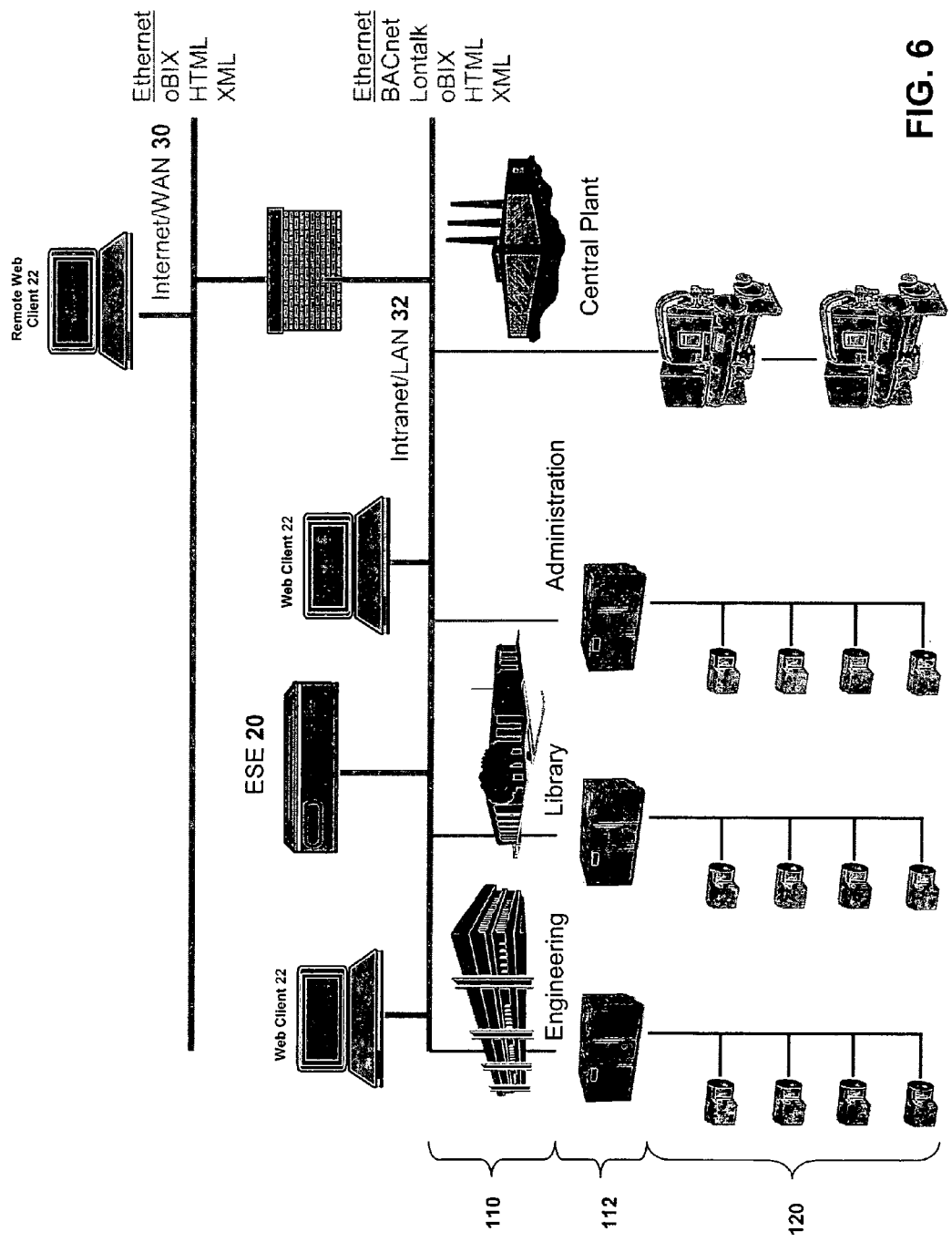
FIG. 6 is a data model example diagram according to one embodiment of the invention.

The main data entities are depicted in FIG. 5, and a related example is depicted in FIG. 6. At a very basic level, each site 110 is a collection of one or more panels 112 (panel objects), and each panel 112 is a collection of one or more objects, which may need extensions 130 for system operability. Site 110 can be an individual site, i.e., building, or a list of sites managed by ESE 20. In the college campus example of FIG. 6, sites 110 managed by ESE 20 include the various buildings on campus, such as Engineering, Library, Administration, and others. Sites 110 also include information for background tasks.

Panel(s) 112 is a single panel 112 or a list of panels known for each site 110 and the information needed by ESE 20 to manage those particular panels. This information can include panel type, version, vendor, and ignore flags in one embodiment. In the college campus example of FIG. 6, each site 110 includes a panel 112. A system controller-level single panel 112 is depicted for each site 110, although a single site 110 can include multiple panels 112.

Object(s) 120 is a list of objects that exist in each panel 112 and is used for navigation, display, and management. In FIG. 6, each panel 112 includes a plurality of objects 120, which may be equipment, sensors, receivers, machines, and other devices.

Object extension(s) 130 is information kept on ESE 20 that is specific for each object 120 as described by the metadata associated with each object 120. Object extensions 130 are used to drive a user interface for determining things such as to which family a specific object belongs when an object is in a different family by the object configuration.

ESE 20 operably reads and writes data in BAS end devices 40, 41, 42, 44, and 46 (referring again generally to system 10 of FIG. 1) that support building automation standard protocols. In the context of FIG. 1 and herein, BAS end devices 42, 44, and 46 can be panels but are distinguished by type in FIG. 1 to illustrate possible configurations and compositions of BAS 10. For example, ESE 20 and BAS 10 as a whole are generally compatible with the BACnet™ protocol and/or XML at a minimum, although physical or virtual media converters 48 may also be needed for particular devices in various embodiments. In one embodiment, ESE 20 reads and writes data based upon provided metadata and definitions, where data read from BAS end devices 40 and 41, for example, is BACnet™ protocol formatted. ESE 20 operably converts the read data to XML for use in ESE 20 applications. ESE 20 therefore can communicate with panels supporting a BACnet™ protocol through syntax conversion while concurrently supporting XML, such as for next-generation panels capable of supporting XML directly. In accordance with the dynamically extensible and automatically configuration architecture of BAS 10, ESE 20 utilizes self-describing plastic and extensible metadata to establish communications and support with BAS end devices 40, 41, 42, 44, and 46 and other elements of BAS 10.

While ESE 20 is compatible with and/or configurable for a wide variety of protocols and standards, particular examples herein will refer to the BACnet™ protocol, Internet 30, and Intranet 32 systems where appropriate, in the context of one non-limiting embodiment of the invention.

Figure 7:
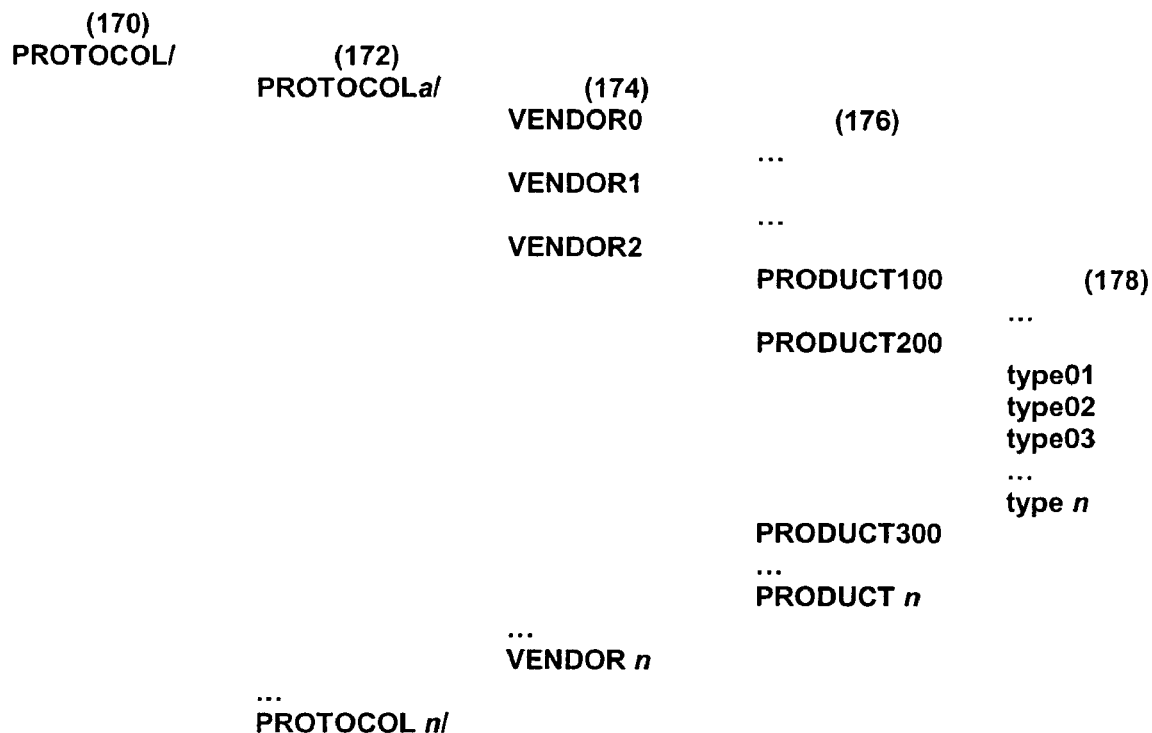
FIG. 7 is a dynamic protocol support diagram according to one embodiment of the invention.

ESE 20 is structured, in one embodiment, to integrate various implementations of BACnet™ and other protocols as natively as possible. ESE 20 can operably and concurrently support multiple versions and implementations, e.g., services supported and proprietary information. This enables ESE 20 to integrate both "inside," i.e., common vendor/manufacturer or platform, and "outside," i.e., other vendor or competitor, devices without requiring manual programming of the object. Referring to FIG. 7, a representative and example dynamic protocol support algorithm table 170 illustrates various "levels" of identification and communication that can be established with a BAS end device in BAS 10. For example, protocol support table 170 includes at least one available protocol 172, or PROTOCOLa/ in FIG. 7. PROTOCOLa/ may be a BACnet™ protocol or another suitable protocol as previously described. PROTOCOLa/ then more specifically includes at least one vendor 174. VENDOR0 may be a default vendor, VENDOR1 may be ASHRAE, VENDOR2 may be TRANE®, and so on, these particularly vendors used only for one example. At least one product 176 may then be associated with each vendor 174, and each product 176 may include at least one type or version 178. When establishing communications with a BAS end device, then, ESE 20 preferably obtains metadata to identify the BAS end device as specifically as possible to establish higher level communications. If ESE 20 is able to identify a first BAS end device to a vendor level 174 and second BAS end device to a type level 178, for example, ESE 20 will be able to establish higher level communications with the second BAS end device because ESE 20 will have more detailed and specific information. Contrast this with current methods of integration of outside BAS end devices in other systems, which require time- and labor-intensive manual programming of the data and relationship by field service technicians unique to each installation, adding to the cost and complexity of these other systems and reducing convenience.

Figure 8:
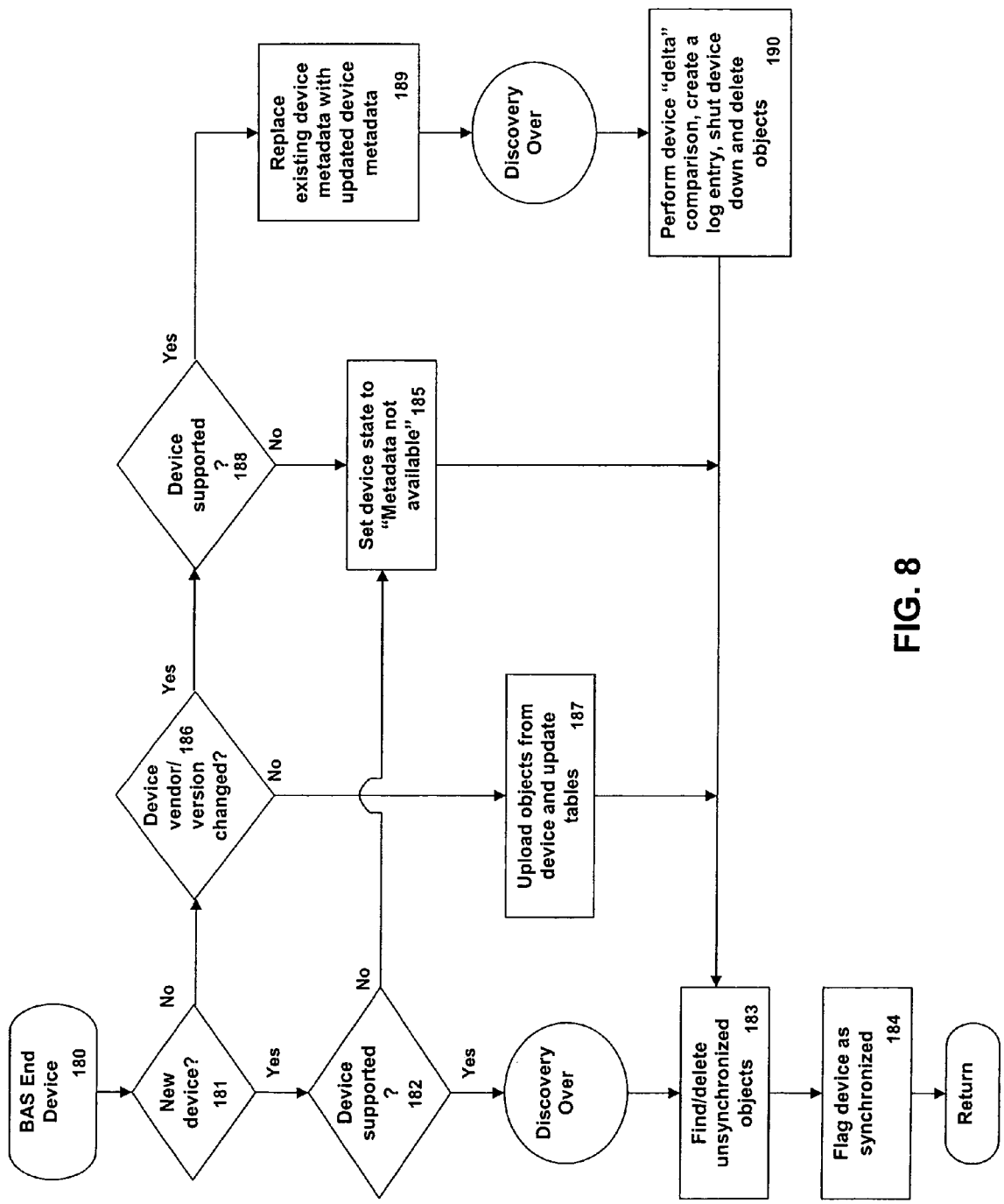
FIG. 8 is a site synchronization process flowchart according to one embodiment of the invention.

For each BAS end device and in accordance with the dynamic protocol support algorithm of FIG. 7, BAS end device synchronization tasks are then performed. Referring to FIG. 8, step 181 is determining whether a BAS end device is new. If the device is new, step 182 is determining whether the BAS end device is supported, i.e., is metadata available. If yes, appropriate metadata for the BAS end device is wired in; the list of supported services for the BAS end device is read; a BAS end device object is created, and internal values are set and stored in the database; and objects are uploaded from the BAS end device and appropriate tables are updated. At step 183, any unsynchronized objects are deleted and the synchronized panel is labelled as such and updated with the latest synchronization date/time at step 184.

Returning to step 182, if a BAS end device is not supported, the end device state is set to "metadata not available" at step 185 and process 180 returns to step 183. Returning to step 181, if a BAS end device is not new and, at step 186, the vendor or version of the BAS end device has not changed, objects are uploaded from the BAS end device and tables are updated at step 187 before returning to step 183. If the BAS end device vendor or version is found to have changed at step 186, step 188 determines whether the BAS end device is supported. If the BAS end device is not supported, process 180 advances to step 185. If the BAS end device is supported, process 180 advances to step 189, wherein existing BAS end device information (metadata) is replaced with new or updated information. In one embodiment, this is accomplished by making a copy of a row in a device table and any associated rows in object and object_extension tables.

Figure 9:
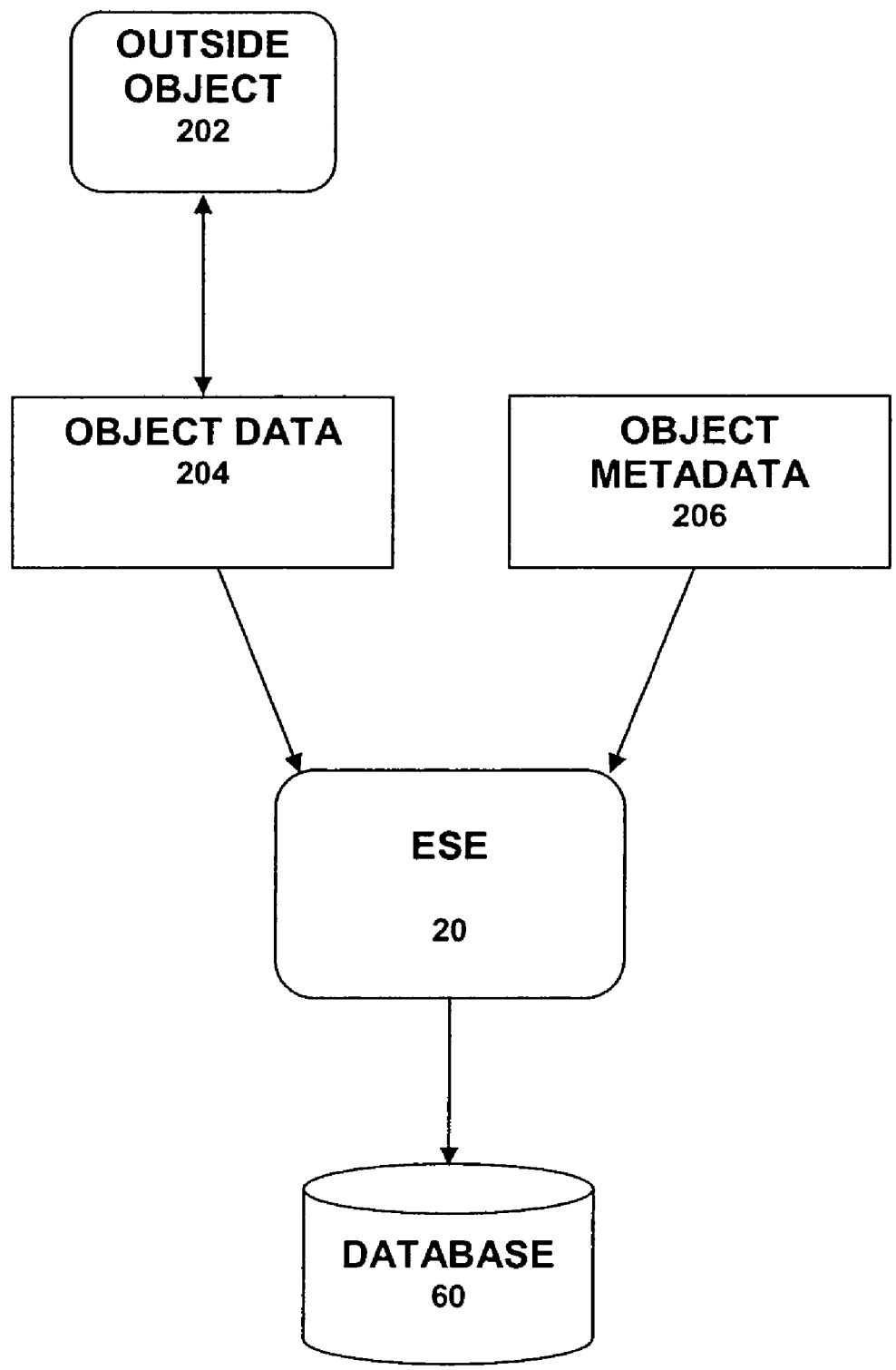
FIG. 9 is an outside object data block diagram according to one embodiment of the invention.

Referring to FIG. 9, ESE 20 provides extensible support to outside object 202 according to object data 204 and object metadata 206. In one embodiment, ESE 20 discovers object 202 at a location. The discovery can be user-initiated, such as by providing a network address of object 202 to ESE 20 via the user interface in one embodiment, or automatic on behalf of ESE 20 in another embodiment. To integrate object 202, ESE 20 utilizes object metadata 206 to obtain a general description of object 202 based upon a communications implementation of the outside vendor of object 202. In one embodiment, object metadata 206 is data description code about object 202 and object data 204. The communications implementation may include, for example, a specific revision and version. ESE 20 of BAS 10 also accommodates changes in BAS 10 over time, including BAS end device additions, removal, or changes, including changes to particular points. ESE 20 further handles versioning and dynamics over time, in contrast to other systems that assume a homogenous system and protocol.

Upon discovery of object 202, ESE 20 determines all available information relevant to operation of object 202 in system 10, including status and setpoints, data collection, alarming, scheduling, and the like, to establish communications with object 202. ESE 20 is not dependent on systems integration activities to program specific data and information; rather, if the information conforms to standard data structures, ESE 20 reads object data 204 directly from object 202. In other words, system objects, including outside object 202, are preferably self-describing as discussed herein and are interrogated for object metadata 206 without programming intervention, such as manual mapping of points. Any specific context given to data 204 according to the vendor of object 202 can be provided by input to ESE 20 without recompilation of production code or field programming of logic.

ESE 20 operably provides an interface for system installation, setup, integration, and support. For example, ESE 20 provides an interface for BAS end devices 40, 41, 42, 44, and 46 setup parameters, including IP address, subnet mask, gateway, and name of server for each, where applicable. ESE 20 further provides a methodology and/or utility to set up and customize web pages, which can include both templates and individual pages, and to serve and publish graphics to web pages. System 10 and ESE 20 also allow user definition of attributes for a given site for grouping purposes. In one embodiment, at a minimum, each site 110 is associated with a geographical and a type attribute and a search function is provided to allow users to search for sites or groups of sites. ESE 20 further preferably accommodates the addition, removal, and general management of entire sites 110 within BAS 10.

ESE 20 efficiently handles data and information to enable operation of BAS 10 and support external interactions with BAS 10. In particular, ESE 20 utilizes data management techniques to enhance communicative performance of BAS 10. In one embodiment, ESE 20 minimizes communication and data transfer related burdens on system 10 and components of system 10 through data caching. The user interface of BAS 10 provides static and dynamic information regarding the status and operation of BAS 10. Dynamic, real-time data from objects in system 10 is presented in the user interface and can be updated according to a defined refresh rate or manually on-demand by a user. Unscheduled real-time data events can also occur at any time, for example as an alarm. BAS 10 can efficiently handle scheduled updates and presentation of dynamic real-time data in order to accommodate unscheduled data requests and events.

Figure 10:
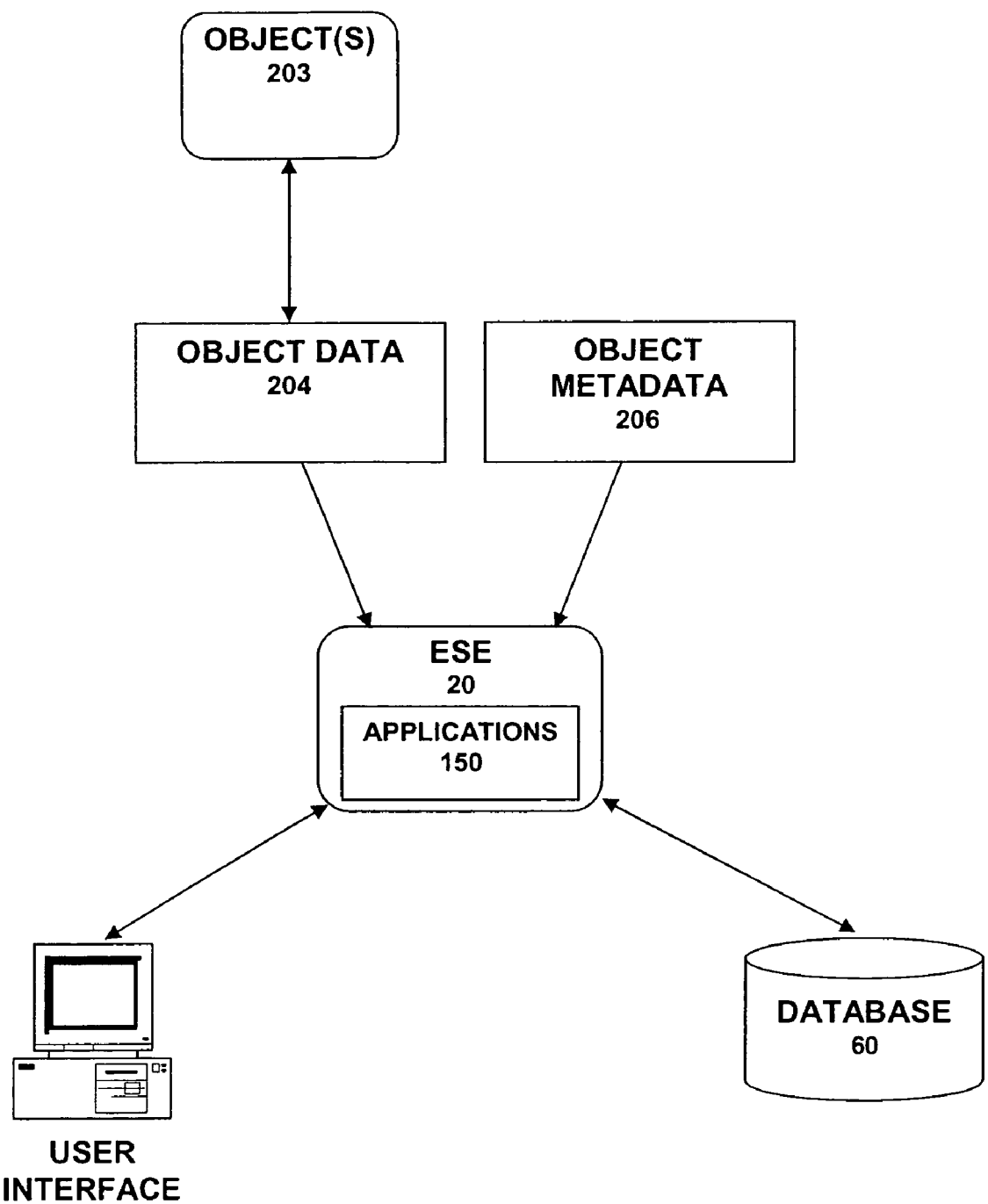
FIG. 10 is a data block diagram according to one embodiment of the invention.

Referring to FIG. 10, ESE 20 and applications 150 implement refresh cache and multi-step delivery processes in one embodiment for responding to user interface requests, including HTTP requests for user interface web-based pages that represent the building automation equipment in system 10. These algorithms enable users to navigate through user interface 160, and request and view both static and dynamic data and information about BAS 10, with as minimal an impact on performance as possible. The refresh cache and multi-step delivery processes implemented by ESE 20 remove the burden from the panels and objects 203, which have much slower information communication performance characteristics. In particular, panels and objects 203 are typically embedded controllers with limited buffers. ESE 20 can sample and refresh data to relieve panels and objects 203 and improve the performance of BAS 10. A refresh or reinitiation rate can be based upon a characteristic of BAS 10 or of a portion of BAS 10. In one embodiment, a refresh rate is related to an end device (panels and objects 203) characteristic, such as a type, version, location, status, user preference, availability, and the like. A refresh rate can also be based upon the data characteristic, such as a data type, a rate of change, a metadata descriptor, a user preference or attribute, and the like. The refresh rate may be related to a user specification or a default set for BAS 10. The refresh rate can also be based upon a logical combination, synthesis, or amalgamation of one or more refresh rates by ESE 20. For example, an overall refresh or reinitiation rate for an end device may conflict with the refresh rate of a particular end device element or a refresh rate based on a data rate of change. ESE 20 can resolve any such conflict, which in one embodiment will be to select the most frequent refresh rate. In other embodiments, the resolution may be a logical combination, a system default, or some other selection or combination of a refresh or reinitiation rate or frequency.

Figure 11:
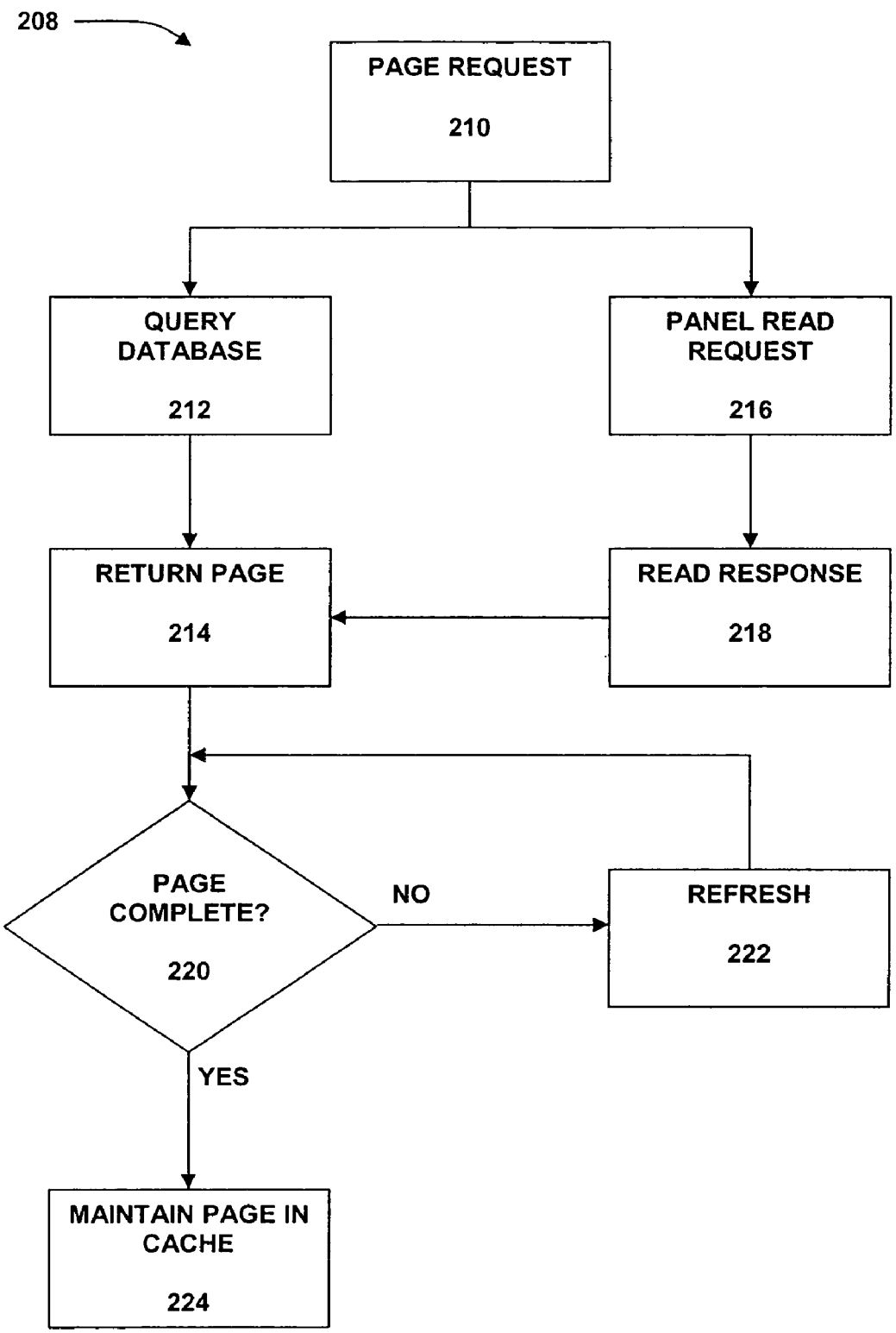
FIG. 11 is a flowchart according to one embodiment of the invention.

Referring to FIGS. 10 and 11, applications 150 use object metadata 204 to determine object information and data 206 discovered from object 204 to be maintained in database 60 in one embodiment. ESE 20 then receives and stores data 206 in database 60. According to process 208, when a user requests a page related to object 203 in user interface 160 at step 210, applications 150 initiate two processes. In a first process, ESE 20 and application 150 determine the page and content based upon object metadata 204 and information 206 stored in database 60 at step 212. A page is then returned to the user with the information available from database 60 at step 214. The initial page returned can include static information related to object 203, BAS 10 in general, or some other object or information.

Concurrent to steps 212 and 214, to obtain the dynamic, real-time, or other information for the requested page that is only available directly from the panel, a read request is generated and processed to go over the wire to the panel at step 216. Due to the typical performance constraints of the specific panels, a read request may take some time to be returned to the user interface page and the information made available to the user. Accordingly, the page initially displayed at step 214 includes as much static and dynamic information as is available, typically that from the database received at step 212 and initial but incomplete responses from the panel at step 218. In one embodiment, the user interface page automatically and periodically refreshes at step 222 to provide additional dynamic information as it becomes available from the panels at step 218 until the page is complete at step 220.

To reduce the performance impact on BAS 10 of a user navigating off the requested page and then returning, which would require repetition of steps 210-220, ESE 20 can maintain the page, complete or otherwise, in cache memory at step 224. In addition to caching the page itself, ESE 20 can also cache the dynamic input/output data received from the BAS end devices at step 218. ESE 20 can periodically refresh the dynamic data for the page for a period of time, even if the page is not currently requested or viewed. The cache also handles situations in which a single object is relevant to multiple pages. Data associated with that object can be requested for a first page, then cached and accessed as necessary from the cache to load subsequent pages that include the some or all of the same data. A cache session can correspond to a user session in one embodiment. In other embodiments, cache session maintenance can be time, object, or system related.

ESE 20 implements a dual-stage periodic refresh in one embodiment of the invention. A first stage is a system (BAS 10) stage and comprises three refresh levels in one embodiment. A first level is a one-time refresh. A one-time refresh typically occurs only a single time, such as when a page is first requested and loaded. Data having a one-time refresh metadata descriptor or tag includes configuration data, for example. A second level is permanent expiration. Some page data and content expires immediately upon request and load because the data is live and real-time, such as a current temperature. Permanent expiration metadata tagged data and content is refreshed each time a page is requested or loaded, the finest refresh granularity. A third refresh level is intermediate the one-time refresh and the permanent expiration and is periodic expiration. Some content, including some real-time data, changes at a slow rate, making permanent expiration inappropriate. A periodic expiration may be refreshed, for example, every ten minutes in one embodiment. Other periods may also be set or may vary according to a metadata descriptor or tag, system-wide setting, or other criteria in other embodiments.

In one embodiment, the cache is transaction-based, keeping the page for a fixed period, for example about fifteen minutes, as long as page hits continue. If a user returns to the page within the period of time, the page and its data are still available and could be immediately presented in user interface 160, instead of having to repeat the BAS end device read request of step 216 and wait for the complete response at step 218.

In another embodiment, the cache is location-based, which is a variation on aging. In a location-based cache, ESE 20 will effect a proactive data fetch time-stamp configured based upon a particular location. ESE 20 utilizes object metadata 204 to determine when data for that object (location) is expired. While the entire page is periodically refreshed according to this scheme, the burden on the object (BAS end device) is reduced because ESE 20 only read requests the data on the page that has expired or that is changing more frequently according to metadata BAS end devices, which may begin to drop commands if barraged with read requests, rather than treating the BAS end devices as servers of data within system 10 from the perspective of user interface 160.

Site management of ESE 20 is an important aspect of BAS 10 from an implementation perspective. Dynamic extensions, enhancements, and changes are intended to be natural, fundamental features of building automation system 10. Further, ESE 20, as a core engine of BAS 10, is designed to be used as the foundation for other systems and devices, including next-generation developments. Each implementation of ESE 20 and BAS 10 is designed to keep site and data management services separate from user interface 160 and applications 150 to ensure that the core engine aspect is not compromised by building ESE 20 and user interface 160 in separate modules.

Figure 12:
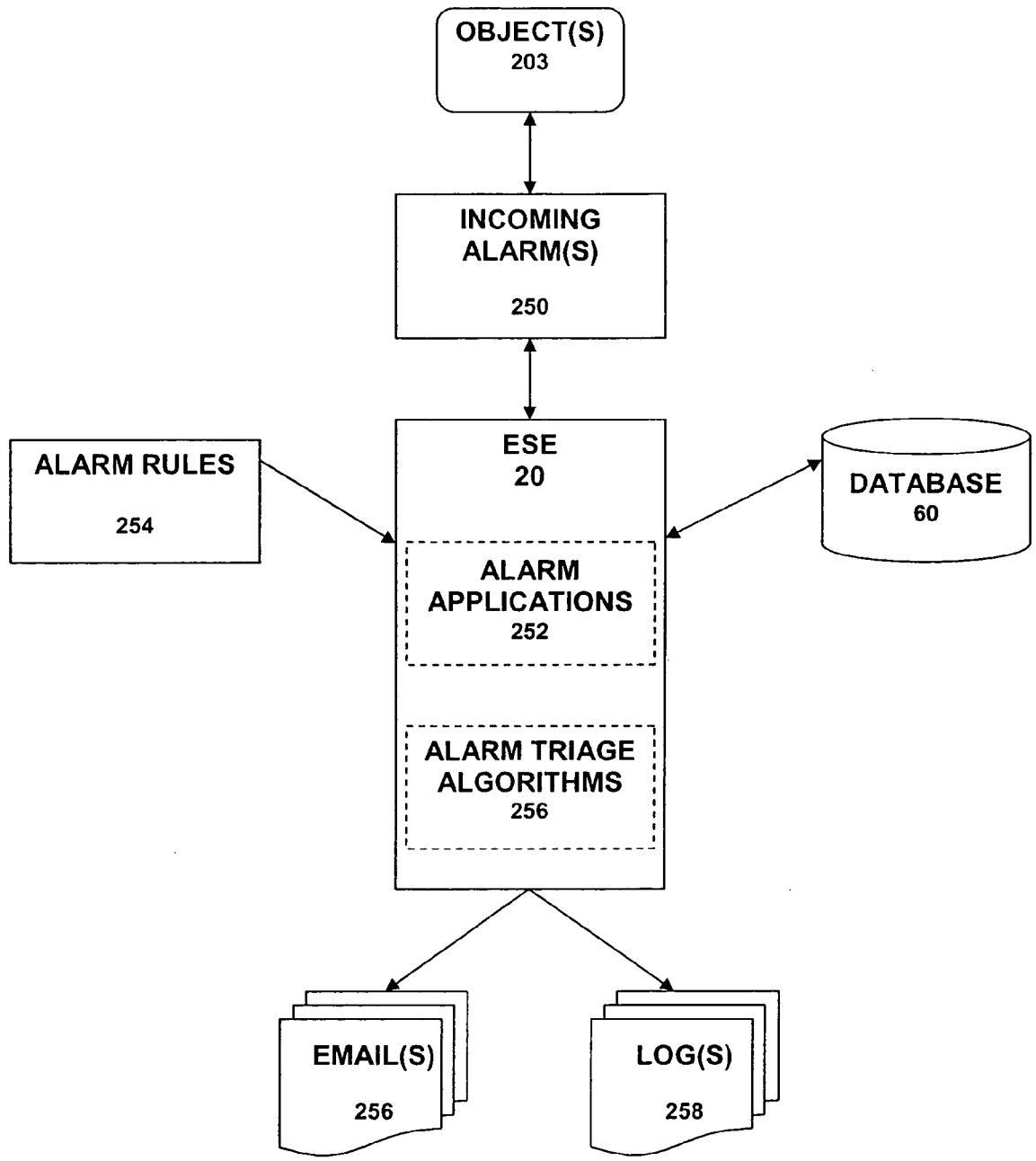
FIG. 12 is an alarm block diagram according to one embodiment of the invention.

Data management services, user interface 160, and applications 150, however, intersect and cooperate in the ordinary operation of BAS 10 and ESE 20. For example, an important aspect of system 10 and ESE 20 is related to alarming. Referring to FIG. 12, system 10 and various objects 203 therein will, by their very function and purpose, occasionally or systematically generate alarms 250. Alarms 250 may be related to an operating state of object 203, a service need status, a detected object or system characteristic, or some other indicator or condition. ESE 20 and alarm applications 252 operably receive alarms 250 from objects 203 and, according to the invention, triage, manage, or otherwise appropriately handle alarms 250. ESE 20 can also store or archive alarms 250 and display an alarm log in user interface 160.

In one embodiment, relevant to alarm triage, ESE 20 can automatically analyze alarm 250 to notify and/or request service or otherwise ensure that the alarm will receive the attention it warrants. Alarm triage, sorting, and filtering can be provided based upon an alarm and/or site attribute and alarm rules 254. By way of example, it can be appreciated that an alarm 250 related to a particular area or object 203 within a facility can a much greater significance than an alarm related to another area within the same facility. Similarly, one type of alarm may require a more rapid response than another type of alarm. Therefore, ESE 20 can automatically assess an incoming alarm according to alarm rules 254 related to an alarm type, source, and/or relevant object attribute and then handle alarm 250 appropriately.

For example, ESE 20 can forward a higher priority alarm via email 256 after ascertaining the relative importance of the alarm indicator according to alarm rules 254. Within system 10, alarm forwarding via email is a user interface 160 customization feature implemented as an administrative function and enables a user to specify to whom or what the notification should be sent. ESE 20 can also simply catalog lower priority alarms for later review by a user in a viewable alarm log.

ESE 20 provides alarm message assessment and diagnostics with respect to alarms received from within system 10 to develop alarm triage algorithms 256. Algorithms 256 can be developed in compliance with rules 254 and applied to match alarm patterns and analyze alarm timings in future events and consolidate messages or provide automated actions. ESE 20 can then intelligently identify patterns, sequences, and/or occurrences of alarms 250 to diagnose a common source and respond appropriately and automatically. Preferred embodiments of ESE 20 can identify, sort, sequence, and trend alarms 250 in order to identify a common link, if any, and reduce the number of alarm notifications 256 sent to a user for manual attention.

For example, a loss of power for a given circuit in a building can create multiple diagnostics. ESE 20 can assess the pattern of diagnostics within BAS 10 and report only the loss of power and not the redundant and source-related alarm messages. ESE 20 can also send only a single alarm notice 256 including information about the common fault to a user in a user-identifiable format. Rather than sending a plurality of alarm notices 256 or complex system-driven information, ESE 20 can report the identified common fault in user-identifiable and defined terms for context. The user can then deal with the single source of the alarms expeditiously, rather than attempting to clear each of the plurality of alarm notices.

ESE 20 can also maintain one or more alarm logs 258 and can catalog or archive alarms in an appropriate log 258. A user can then review log 258 and acknowledge or delete the alarms as desired. ESE 20 can also automatically and periodically purge alarm log(s) 258 as needed or as defined by a user or administrator of BAS 10. Alarms are typically time-stamp recorded and/or sorted by some characteristic, such as object or type.

In one embodiment, alarms 250 are preferably received and handled by ESE 20 in real time. In another embodiment, such as one incorporating legacy panels and devices, ESE 20 optionally collects alarms 250 from objects on a periodic basis, such as hourly, daily, or more or less frequently.

In addition to automatically handling and triaging alarms, BAS 10 and more particularly ESE 20 can trend alarms and other data. Trending within BAS 10 is an intuitive and efficient management and diagnostic tool. In one embodiment, trend data is collected by ESE 20 from one or more objects 40, 42, 44, and/or 46 at a maximum frequency of once per minute or at another lower frequency or on a specific scheduled basis as defined by a user or administrator. Trend data can then be stored in a database and, in one embodiment, is available for sharing with network peers.

Building automation system 10 is therefore an object-oriented system designed with algorithms that work with self-describing panels 40 or objects. Algorithms implemented as part of BAS 10 communicate with objects to determine whether the objects are operating with algorithms by which they can be identified and integrated. If BAS 10 cannot determine whether an object is operating with an algorithm, BAS 10 intelligently and automatically defines the object as an exception. Building automation system 10 is universally self-describing in that BAS 10 applies concepts and captures algorithms based on object self-descriptions. The algorithms are then translated to accomplish associated mechanical aspects of the objects and BAS 10.

The present invention further provides the ability to alter definitions of objects in ESE 20 without having to recompile the production code. This provides for ease of maintenance and product support. Altered or updated definitions can then be input files to ESE 20, and complete or more complex updates can be made separately. Contrast this update process of the present invention with current methods, in which in order to get an update to object definitions to the end user or customer, production code needs to be rebuilt, tested, and updated for an installation. This increases the amount of time required by an on-site technician and the risk of failed installations.

In one embodiment, a building automation system (BAS) according to the invention comprises a plurality of end devices each associated with at least one of a space, a system, or a subsystem for at least a portion of a building or campus; at least one communication network communicatively coupling at least a portion of the plurality of end devices and supporting a plurality of communication protocols; and a protocol-independent server engine communicatively coupled to the at least one communication network. The server engine includes programming means for selectively implementing a dynamic extensibility capability for the BAS that establishes communications with and control of the plurality of end devices over the plurality of communication protocols; and programming means for selectively implementing an automatic configuration capability for the BAS that supports addition of end devices to the plurality of end devices by determining at least one characteristic of each end device, the at least one characteristic being selected from the set consisting of a self-describing status and a non-self-describing status. For an end device having a self-describing status, the server engine includes programming means for accepting and storing data and metadata descriptors communicated from the end device. For an end device having a non-self-describing status, the server engine includes programming means for searching a database of data and metadata descriptors for end devices maintained by the server engine for data and metadata descriptors based on the non-self-describing status of the end device and automatically requesting supplemental manually programmed data and metadata descriptors for the end device if the non-self-describing status of the device is not sufficient to retrieve data and metadata descriptors for the end device from the database.

In another embodiment, a method of establishing communications with unknown end devices in a building automation system (BAS) based upon metadata descriptors provided by known and unknown end devices comprises discovering an unknown end device on a communication network, the unknown end device associated with at least one of a point, a space, a system, or a subsystem for at least a portion of a building or campus. The unknown end device is queried for a communication protocol metadata descriptor and classified as a self-describing end device if the unknown end device provides a communication protocol metadata descriptor in response to the query and selecting a communication protocol that corresponds to the communication protocol metadata descriptor for the unknown end device. The unknown end device is classified as a non-self-describing end device if the unknown end device does not provide a communication protocol metadata descriptor in response to the query and automatically requesting supplemental manually programmed communication protocol descriptors.

The invention may be embodied in other specific forms without departing from the spirit of the essential attributes thereof; therefore the illustrated embodiment should be considered in all respects as illustrative and not restrictive, reference being made to the appended claims rather than to the foregoing description to indicate the scope of the invention.

What is claimed is:

1. A method for establishing communications with unknown end devices in a building automation system (BAS) based upon metadata descriptors provided by known and unknown end devices, the method comprising the steps of:
    discovering an unknown end device on a communication network utilizing a first communication protocol, the unknown end device associated with at least one of a point, a space, a system, or a subsystem for at least a portion of a building or campus, wherein discovering includes requesting the vendor data and product data from the unknown end device;
    querying the unknown end device for a HVAC communication protocol metadata descriptor;
    classifying the unknown end device as a self-describing end device if the unknown end device provides a HVAC communication protocol metadata descriptor in response to the query and selecting a second communication protocol that corresponds to the HVAC communication protocol metadata descriptor for the unknown end device; and
    classifying the unknown end device as a non-self-describing end device if the unknown end device does not provide a HVAC communication protocol metadata descriptor in response to the query, comparing the non-self-describing end device to known end devices of the BAS for at least one similar characteristic.

2. The method of claim 1, further comprising the step of:
    automatically requesting supplemental manually programmed communication protocol descriptors for the non-self-describing end device.

3. The method of claim 1, further comprising the steps of:
    selecting a general communication protocol of a known end device for the non-self-describing end device if a similar characteristic is found.

4. The method of claim 1, wherein the step of classifying the unknown end device as a self-describing end device further comprises:
  establishing operational communications with the self-describing end device according to the selected second communication protocol;
  automatically configuring the self-describing end device within the BAS; and
  dynamically extending the BAS to include the self-describing end device.

5. A building automation system (BAS) comprising:
  means for discovering an unknown end device on a communication network utilizing a first communication protocol, the unknown end device associated with at least one of a point, a space, a system, or a subsystem for at least a portion of a building or campus, the means for discovering includes means for requesting vendor data and product data from the unknown end device;
  means for querying the unknown end device for a HVAC communication protocol metadata descriptor;
  means for classifying the unknown end device as a self-describing end device if the unknown end device provides a HVAC communication protocol metadata descriptor in response to the query and for selecting a second communication protocol that corresponds to the communication protocol metadata descriptor for the unknown end device; and
  means for classifying the unknown end device as a non-self-describing end device if the unknown end device does not provide a HVAC communication protocol metadata descriptor in response to the query, and means for comparing the non-self-describing end device to known end devices of the BAS for at least one similar characteristic.

6. The BAS of claim 5, further comprising:
  means for automatically requesting supplemental manually programmed communication protocol descriptors for the non-self-describing end device.

7. The BAS of claim 5, further comprising:
  means for selecting a general communication protocol of a known end device for the non-self-describing end device if a similar characteristic is found.

8. The BAS of claim 5, wherein the means for classifying the unknown end device as a self-describing end device further comprises:
  means for establishing operational communications with the self-describing end device according to the selected second communication protocol;
  means for automatically configuring the self-describing end device within the BAS; and
  means for dynamically extending the BAS to include the self-describing end device.

9. A building automation system (BAS) comprising:
  a plurality of end devices each associated with at least one of a space, a system, or a subsystem for at least a portion of a building or a campus;
  at least one communication network communicatively coupling at least a portion of the plurality of end devices and supporting a plurality of HVAC communication protocols;
  a protocol-independent server engine communicatively coupled to the at least one communication network, the server engine including:
    programming means for selectively implementing a dynamic extensibility capability for the BAS that establishes communications with and control of the plurality of end devices over at least one of the plurality of HVAC communication protocols, the programming means includes means for requesting vendor data, product data, and communication protocol descriptor data from at least one of the plurality of end devices; and
    programming means for selectively implementing an automatic configuration capability for the BAS that supports addition of end devices to the plurality of end devices by determining at least one characteristic of each end device, the at least one characteristic being selected from a set consisting of a self-describing status and a non-self-describing status, including:
      for an end device having a self-describing status, programming means for accepting and storing data and metadata descriptors communicated from the end device; and
      for an end device having a non-self-describing status, programming means for searching a database of data and metadata descriptors for end devices maintained by the server engine for data and metadata descriptors based on the non-self-describing status of the end device, and for automatically requesting supplemental manually programmed data and metadata descriptors for the end device if the non-self-describing status of the device is not sufficient to retrieve data and metadata descriptors for the end device from the database.

10. The BAS of claim 9, wherein the communication network comprises the Internet.

11. The BAS of claim 9, wherein at least a portion of the communication network is wireless.

12. The BAS of claim 9, wherein the server engine further comprises programming means for determining a second communication protocol for an end device having a self-describing status based upon the data and metadata descriptors communicated from the end device.

13. The BAS of claim 12, wherein the plurality of communication protocols comprises at least one protocol selected from a group consisting of a BACnet protocol, a LonTalk protocol, and a protocol native to the BAS.

14. The BAS of claim 9, wherein the data and metadata descriptors communicated from the end device comprise information related to at least one of a set consisting of a communication protocol of the end device; a communication protocol version of the end device; a type of the end device; a version of the end device; a status of the end device; a location of the end device; an intra-BAS relation of the end device with at least one of a space, a system, a subsystem, a building, a campus, or another end device; a schedule of the end device; a schedule of the BAS; and an extension needed by the end device.

15. The BAS of claim 9, wherein the BAS further comprises user interface means for presenting a request for, and accepting a response of, supplemental manually programmed data and metadata descriptors for an end device.

16. A building automation system (BAS) comprising:
  a plurality of control/sensor means for measuring and communicating data about at least one of a point, a space, a system, or a subsystem for at least a portion of a building or campus;
  a first communication means for communicatively coupling at least a portion of the plurality of control/sensor means and supporting a plurality of HVAC communication protocols; and
  protocol-independent computing and storage means for controlling the plurality of control/sensor means through the first communication means, the computing and storage means including:
  programming means for selectively implementing a dynamic extensibility capability for the BAS that establishes communications with and control of the plurality of control/sensor means over the plurality of HVAC communication protocols, including means for requesting vendor data and product data from the plurality of control/sensor means; and
  programming means for selectively implementing an automatic configuration capability for the BAS that supports addition of control/sensor means to the plurality of control/sensor means by determining at least one characteristic of each control/sensor means, the at least one characteristic being selected from a set consisting of a self-describing status and a non-self-describing status, including:
    for a control/sensor means having a self-describing status, programming means for accepting and storing data and metadata descriptors communicated from the control/sensor means; and
    for a control/sensor means having a non-self-describing status, programming means for searching a database of data and metadata descriptors for control/sensor means maintained by the computing and storage means for data and metadata descriptors based on the non-self-describing status of the end device, and automatically requesting supplemental manually programmed data and metadata descriptors for the end device if the non-self-describing status of the device is not sufficient to retrieve data and metadata descriptors for the end device from the database.

17. The BAS of claim 16, wherein each of the plurality of control/sensor means is selected from a set consisting of:
  a panel, a sensor, a controller, a microprocessor-controlled device, a converter, a thermostat, a furnace, a heating system, a chiller, a cooling system, an air conditioner, an air filter, an air purifier, a fire and life safety system, a security system, an alarm system, an occupancy sensor, an electrical system monitor and controller, a lighting system monitor and controller, a ventilation system monitor and controller, a smoke sensor, a light sensor, a motion sensor, a humidity sensor, a pump, an air handler, fluid and air moving and handling equipment, a terminal device, life science and pharmacological control equipment and monitoring systems, a positive pressure clean room, a negative pressure clean room, industrial automation and control equipment and systems, and a programmable logic controller.

18. The BAS of claim 16, wherein the data and metadata descriptors comprise a schedule of the control/sensor means.

19. A building automation system (BAS) comprising:
  a plurality of end devices each associated with at least one of a space, a system, or a subsystem for at least a portion of a building or a campus;
  at least one communication network communicatively coupling at least a portion of the plurality of end devices and supporting a plurality of HVAC communication protocols;
  a protocol-independent server engine communicatively coupled to the at least one communication network, the server engine including:
    software instructions adapted to implement a dynamic extensibility capability for the BAS and establish communications with and control of the plurality of end devices over at least one of the plurality of HVAC communication protocols, wherein the dynamic extensibility capability includes software instructions requesting vendor data and product data from at least one of the plurality of end devices; and
    software instructions adapted to implement an automatic configuration capability for the BAS to support addition of end devices to the plurality of end devices by determining at least one characteristic of each end device, the at least one characteristic being selected from a set consisting of a self-describing status and a non-self-describing status, including:
      for an end device having a self-describing status, software instructions adapted to accept and store data and metadata descriptors communicated from the end device, the metadata descriptors including a type of the end device, a status of the end device, an intra-BAS relation of the end device with at least one of the space, the system, the subsystem for the portion of the building, the campus, or another end device; a schedule of the end device; a schedule of the BAS, or an extension needed by the end device; and
      for an end device having a non-self-describing status, software instructions adapted to search a database of data and metadata descriptors for end devices maintained by the server engine for data and metadata descriptors based on the non-self-describing status of the end device and to requesting supplemental manually programmed data and metadata descriptors for the end device if the non-self-describing status of the device is not sufficient to retrieve data and metadata descriptors for the end device from the database.

20. The method of claim 1, wherein the second communication protocol comprises at least one protocol selected from a group consisting of a BACnet protocol, a LonTalk protocol, an oBIX protocol, and a protocol native to the BAS.

* * * * *